United States Patent
Sato et al.

(10) Patent No.: US 9,610,744 B2
(45) Date of Patent: Apr. 4, 2017

(54) BLOW MOLDING DEVICE AND A METHOD FOR MANUFACTURING A CONTAINER

(71) Applicant: Discma AG, Hunenberg (CH)

(72) Inventors: Sumito Sato, Tokyo (JP); Nobuyuki Tamura, Tokyo (JP); Takeshi Nagashima, Tokyo (JP)

(73) Assignee: DISCMA AG, Hunenburg (CH)

( * ) Notice: Subject to any disclaimer, the term of this patent is extended or adjusted under 35 U.S.C. 154(b) by 158 days.

(21) Appl. No.: 14/369,598

(22) PCT Filed: Nov. 21, 2012

(86) PCT No.: PCT/JP2012/007590
§ 371 (c)(1),
(2) Date: Jun. 27, 2014

(87) PCT Pub. No.: WO2013/099108
PCT Pub. Date: Jul. 4, 2013

(65) Prior Publication Data
US 2014/0367895 A1    Dec. 18, 2014

(30) Foreign Application Priority Data

Dec. 27, 2011 (JP) .................................. 2011-285664
Jan. 31, 2012 (JP) .................................. 2012-018599
Mar. 30, 2012 (JP) .................................. 2012-081152

(51) Int. Cl.
*B29C 49/48*    (2006.01)
*B29D 22/00*    (2006.01)
(Continued)

(52) U.S. Cl.
CPC ............ *B29D 22/003* (2013.01); *B29C 49/46* (2013.01); *B29C 49/58* (2013.01); *B65B 3/022* (2013.01);
(Continued)

(58) Field of Classification Search
None
See application file for complete search history.

(56) References Cited

U.S. PATENT DOCUMENTS

| 6,214,282 | B1 * | 4/2001 | Katou .................. B65B 3/022 264/163 |
| 2008/0029928 | A1 * | 2/2008 | Andison ............... B29C 49/46 264/238 |
| 2010/0237528 | A1 | 9/2010 | Derrien et al. |

FOREIGN PATENT DOCUMENTS

| JP | A-11-048316 | 2/1999 |
| JP | A-2000-043129 | 2/2000 |

(Continued)

OTHER PUBLICATIONS

International Search Report issued in International Application No. PCT/JP2012/007590 dated Mar. 5, 2013.

*Primary Examiner* — Monica Huson
(74) *Attorney, Agent, or Firm* — Eric J. Sosenko; Jonathan P. O'Brien; Honigman Miller Schwartz and Cohn LLP

(57) ABSTRACT

To regulate, in blow molding device using liquid, such as beverage, cosmetic product, and pharmaceutical product, filled in final product as pressurized liquid, head space in container which is filled with content liquid during molding to be predetermined volume, provided is blow molding device including blow nozzle configured to tightly communicate with mouth tubular portion of preform. In state where rod is disposed to be inserted into blow nozzle and where tip portion of rod is inserted into preform, pressurized liquid is supplied into preform via tubular introduction path formed by blow nozzle and rod, thereby expandingly shaping container in accordance with cavity of metal mold. When container is shaped and supply of pressurized liquid is stopped, rod is disinserted from container, and according to (Continued)

shape and insert position of tip portion of rod, head space of shaped container that is filled with liquid is regulated to be predetermined volume.

18 Claims, 25 Drawing Sheets

(51) Int. Cl.
- *B29C 49/46* (2006.01)
- *B65B 3/02* (2006.01)
- *B29C 49/12* (2006.01)
- *B29C 49/42* (2006.01)
- *B29C 49/78* (2006.01)
- *B29C 49/58* (2006.01)
- *B29L 22/00* (2006.01)
- *B29C 49/06* (2006.01)

(52) U.S. Cl.
CPC .............. *B29C 49/06* (2013.01); *B29C 49/12* (2013.01); *B29C 49/4273* (2013.01); *B29C 49/783* (2013.01); *B29C 2049/1219* (2013.01); *B29C 2049/4294* (2013.01); *B29C 2049/465* (2013.01); *B29C 2049/5803* (2013.01); *B29C 2049/5858* (2013.01); *B29L 2022/00* (2013.01)

(56) References Cited

FOREIGN PATENT DOCUMENTS

| | | |
|---|---|---|
| JP | A-2003-251685 | 9/2003 |
| JP | 2009533290 A | 9/2009 |
| JP | A-2010-528900 | 8/2010 |
| JP | 2013541448 A | 11/2013 |

\* cited by examiner

BLOW MOLDING DEVICE AND A METHOD FOR MANUFACTURING A CONTAINER

TECHNICAL FIELD

The present invention relates to a device for blow molding a synthetic resin preform and a method for manufacturing a container with use of the device.

BACKGROUND ART

With their numerous excellent characteristics, blow molded bottle bodies made of polyethylene terephthalate (PET) resin (so-called pet bottles) are used as bottle body containers in a variety of fields.

Containers of such a kind are generally molded by expandingly stretching and deforming a preform that have been injection molded into a bottomed tubular shape in a state where the preform is heated to a temperature at which a stretching effect is achieved.

For example, as illustrated in FIG. 26 (which corresponds to FIG. 12 in Patent Literature 1), a preform 31 heated to a temperature at which the stretching effect is achieved is fitted to a blow metal mold 101, with a mouth tubular portion 32 of the preform 31 being projected upward and with a neck ring 33 being engaged with a neck support flange portion 103, the neck ring 33 being integrally formed around a lower end on an outer circumferential surface of the mouth tubular portion 32 of the preform 31. Then, a guide tubular portion 110, which is a tip portion of a blow nozzle 105, is loosely fitted into the mouth tubular portion 32 of the preform 31, and in this state, the preform 31 is stretched in an axis direction by means of a stretching rod 116 inserted through an insertion hole 111 formed through a middle of the blow nozzle 105 and is also stretched in a radial direction by means of blow air as a pressurized fluid through the insertion hole 111 so as to be molded into a bottle body 41.

Patent Literature 2 also discloses an invention of a method for blow molding a preform by using a liquid instead of blow air as the pressurized fluid. In the molding method, by using a content liquid that is to be filled in a final product as a liquid, a filling step may be omitted, and a production line may be simplified.

CITATION LIST

Patent Literature

PTL 1: JP2003251685A
PTL 2: JP2000043129A

SUMMARY OF THE INVENTION

Technical Problems

When a pressurized liquid is used in blow molding as disclosed in D2, a container resulted from molding is filled with the liquid. When the blow nozzle is disengaged from the mouth tubular portion, the liquid is scattered from the mouth tubular portion to a surrounding outside, and it is difficult to regulate head space of the content fluid to be a constant volume. As a result, products have different head space, and a problem concerning merchantability arises.

Furthermore, when a stretching rod is used for vertical stretching, the stretching rod after the vertical stretching occupies a significant volume in a shaped container. The above leads to a problem that, when the stretching rod is pulled out of the container in a state where the container is shaped by means of the pressurized fluid at a final stage of blow molding and then a supply of the fluid is stopped, an inside of the container is placed under reduced pressure and that the shaped container is deformed such that a volume of the container is reduced.

In view of the above, the present invention is to regulate, in a blow molding device that uses a liquid, such as a beverage, a cosmetic product, a pharmaceutical product, or the like, that is to be filled in a final product as the pressurized liquid, head space in a container filled with the content fluid at the time of molding to be a predetermined volume.

Furthermore, when a stretching rod is used for vertical stretching, the present invention is to effectively prevent volume reduction and deformation of the container attributed to the operation of pulling out of the stretching rod.

Solution to Problems

A first aspect of the present invention resides in a blow molding device for blow molding a bottomed tubular preform including a mouth tubular portion projecting at an upper end of the preform, the blow molding device including:

a metal mold used for the blow molding; and a blow nozzle configured to tightly communicate with the mouth tubular portion when the preform is fitted to the metal mold, wherein in a state where a rod is disposed to be inserted into the blow nozzle and where a tip portion of the rod is inserted into the preform, a pressurized liquid is supplied into the preform via a tubular introduction path formed by means of the blow nozzle and the rod, thereby expandingly shaping a container in accordance with a cavity of the metal mold, and when the container is shaped and the supply of the pressurized liquid is stopped, the rod is disinserted from the container, and according to a shape and an insert position of the tip portion of the rod, head space of the shaped container that is filled with the liquid is regulated to be a predetermined volume.

According to the device with the above structure, by letting a predetermined volume, that is, a volume to be filled in a final container, of the pressurized liquid remain in a region extending from the introduction path to the inside of the container in a state where the container is shaped and where the supply of the liquid is stopped, and by disinserting or pulling out the tip portion of the rod from the container in this state, all the liquid remaining in the introduction path is flowed from the mouth tubular portion into the container without being scattered to a surrounding outside. As a result, the volume of the head space is reproducibly regulated.

That is to say, the blow nozzle is disengaged from the mouth tubular portion in a state where all the liquid is flowed into the container and where the head space is formed in an upper portion of the container. Accordingly, the problem of the liquid being scattered to the surrounding outside in conjunction with the disengagement of the blow nozzle is solved, and the volume of the head space is reproducibly regulated.

In this regard, the rod with the above structure provides a function of regulating a liquid surface of the liquid remaining in the region extending from the introduction path to the inside of the container. By setting a volume of the tip portion inserted in the container in advance in accordance with an insert position of the rod and a shape of the tip portion such as a diameter, the head space in the container is regulated to be the predetermined volume.

The insert position of the rod may be set with high precision by using a servo mechanism.

Even when it is needed to vary, for a single container, the head space according to products or when containers with different shapes are molded, this need is met easily without significantly changing the device, by changing the shape of the tip portion of the rod or by changing a degree of insertion of the tip portion, for example.

By the aforementioned advantageous effects, the head space in a container that is filled with the content liquid at the time of molding is regulated to the predetermined volume. Accordingly, the conventional problem occurring in blow molding where a liquid, such as a beverage, a cosmetic product, a pharmaceutical product, or the like, that is filled in a final product is pressurized and used instead of blow air, that is to say, the problem of difficulty in regulating the head space of the liquid to be a constant volume because of the liquid being scattered from the mouth tubular portion to the surrounding outside, is solved.

A second aspect of the present invention resides in the blow molding device according to the first aspect, wherein the blow nozzle includes a circumferential wall that is provided with a vent hole. The vent hole is provided in an openable and closable manner for bringing an outside of the blow nozzle into communication with an inside of the blow nozzle.

In the molding device with the structure according to the first aspect of the present invention, when the rod is disinserted from the container in the state where the container is shaped and where the supply of the pressurized liquid is stopped, the inside of the container is placed under reduced pressure, and the shaped container might be deformed such that a volume of the container is reduced. However, according to the above structure, when the rod is disinserted from the container after the container is shaped and the supply of the pressurized liquid is stopped, the aforementioned deformation of the container is effectively prevented by mitigating the reduced pressure state within the container by switching the vent hole into an open state so that the outside of the blow nozzle is in communication with the introduction path.

A third aspect of the present invention resides in the blow molding device according to the first or the second aspect, wherein the blow nozzle is provided, at a tip thereof, with an engaging tubular piece configured to be engaged into the mouth tubular portion of the preform, the engaging tubular piece is provided, on an outer circumferential wall thereof, with a circumferential stepped portion whose diameter is decreased toward a tip thereof, and the blow nozzle is brought into the tight communication with the mouth tubular portion as a result of abutment between the circumferential stepped portion and an upper end surface of the mouth tubular portion via a seal member.

The above structure concerns a way of sealing for bringing the blow nozzle into the tight communication with the mouth tubular portion. With the above structure, sealing performance is reliably maintained despite simplicity in structure, and the preform may be fitted or released from the fitting quickly. Besides, maintenance including exchange of the seal member may be easily implemented. Of course, the above structure concerning the way of sealing is merely an example, and any appropriate way of sealing may be adopted in consideration of sealing performance, productivity, or the like.

A fourth aspect of the present invention resides in the blow molding device according to the first, the second, or the third aspect, wherein the rod includes a stretching rod for vertically stretching the preform.

The above structure concerns the blow molding device in which the stretching rod used for vertically stretching the preform is disposed to be inserted into the blow nozzle. The stretching rod is used as the rod for regulating the head space.

A fifth aspect of the present invention resides in a manufacturing method of a synthetic resin container with use of the blow molding device according to the first, the second, the third, or the fourth aspect of the present invention. In the above manufacturing method, the following steps (1)-(4) are performed in sequence:

the step (1) of fitting the bottomed tubular preform to the metal mold used for the blow molding with the mouth tubular portion of the preform being projected to outside;

the step (2) of inserting the tip portion of the rod into the preform;

the step (3) of supplying a pressurized liquid from the mouth tubular portion into the preform via the introduction path, and expandingly shaping the container by means of the pressurized liquid in accordance with a shape of the cavity of the metal mold; and the step (4), after the container is shaped, of stopping the supply of the pressurized liquid, disinserting the tip portion of the rod from the container, and regulating head space of the shaped container that is filled with the liquid to be the predetermined volume.

A sixth aspect of the present invention resides in the manufacturing method of a container according to the fifth aspect of the present invention, wherein the rod includes a stretching rod for vertically stretching the preform, and in the step (3), the preform is vertically stretched by the stretching rod, and the pressurized liquid is supplied from the mouth tubular portion into the preform via the introduction path, and by means of the pressurized liquid, the container is expandingly shaped in accordance with the shape of the cavity of the metal mold.

The above manufacturing method corresponds to biaxial stretching blow molding, and in this circumstance, the insert position of the rod (stretching rod) after the container is shaped reaches a bottom portion of the container.

A seventh aspect of the present invention resides in the manufacturing method of a synthetic resin container according to the fifth or the sixth aspect, wherein in the step (4), when the rod is disinserted from the container after the container is shaped and the supply of the pressurized liquid is stopped, a vent hole is switched to an open state for bringing an outside of the blow nozzle into communication with an inside of the blow nozzle. With the above structure, the reduced pressure state within the container is mitigated, and the deformation of the container due to reduced pressure is effectively prevented.

An eighth aspect of the present invention resides in the blow molding device of the first aspect, wherein the rod includes a stretching rod for vertically stretching the preform, the stretching rod including a tubular portion in a region extending from an upper end portion to a predetermined height position of the stretching rod, the tubular portion being provided, inside thereof, with a discharge path extending vertically, and the stretching rod also including a horizontal hole provided below the tubular portion to extend through a tubular wall and communicate with the discharge path, the pressurized liquid is supplied into the preform via the tubular introduction path formed by means of the blow nozzle and the stretching rod, thereby shaping the container in accordance with the cavity of the metal mold, after the container is shaped and the supply of the pressurized liquid is stopped, pressurized air is supplied to the introduction path, thereby pressurizing the liquid remaining in a portion extending from the inside of the container to the introduction path, and thereby discharging a part of the remaining liquid via the horizontal hole of the stretching rod and the discharge path, and according to a height position at which the horizontal hole is located, the head space of the shaped container that is filled with the liquid is regulated to be the predetermined volume.

According to the device with the above structure, in a state where the bottomed cylindrical preform is biaxially stretched and blown by means of the stretching rod and the pressurized liquid and where the container is shaped, the liquid remaining in the portion extending from the inside of the container to the introduction path is pressurized by means of the pressurized air supplied to the introduction path. By doing so, the part of the remaining liquid is discharged via the horizontal hole of the stretching rod and the discharge path.

Furthermore, the discharge of the liquid spontaneously stops when the liquid surface is lowered to the height position at which the horizontal hole is located, and therefore, the liquid surface of the liquid is regulated to the height position at which the horizontal hole is located, easily, reproducibly, and reliably.

With the above advantageous effects, the head space in the container that is filled with the content liquid at the time of molding is regulated to the predetermined volume. Accordingly, the conventional problem occurring in blow molding where a liquid, such as a beverage, a cosmetic product, a pharmaceutical product, or the like, that is filled in a final product is pressurized and used instead of blow air, that is to say, the problem of difficulty in regulating the head space of the liquid to be a constant volume because of the liquid being scattered from the mouth tubular portion to the surrounding outside, is solved.

A ninth aspect of the present invention resides in the blow molding device according to the eighth aspect, further including a pressurized liquid supply unit configured to supply the pressurized liquid; and a pressurized air supply unit configured to supply pressurized air, wherein the pressurized liquid supply unit and the pressurized air supply unit are driven by a common pressurizing device.

According to the above structure, it is not necessary to additionally provide a pressurizing device, such as a compressor, a pump, or the like, that requires a large power source for the purpose of supplying the pressurized air used for discharging the liquid. Furthermore, since the pressurizing device is a facility commonly installed in molding devices for supplying a pressurized liquid used for vertically stretching a preform, the device according to the present invention is configured without changing the structure of a conventional device.

A tenth aspect of the present invention resides in the blow molding device according to the eighth or the ninth aspect, wherein the discharged liquid is returned to the pressurized liquid supply unit configured to supply the pressurized liquid.

In the long run, the liquid, such as a beverage, a cosmetic product, a pharmaceutical product, or the like, that is filled in a product container such as a bottle body is recycled and used without waste.

An eleventh aspect of the present invention resides in the blow molding device according to the eighth, the ninth, or the tenth aspect, wherein, as in the first aspect, the blow nozzle is provided, at a tip thereof, with an engaging tubular piece configured to be engaged into the mouth tubular portion of the preform, the engaging tubular piece is provided, on an outer circumferential wall thereof, with a circumferential stepped portion whose diameter is decreased toward a tip thereof, and the blow nozzle is brought into the tight communication with the mouth tubular portion as a result of abutment between the circumferential stepped portion and an upper end surface of the mouth tubular portion via a seal member.

A twelfth aspect of the present invention resides in a manufacturing method of a synthetic resin container with use of the blow molding device according to the eighth, the ninth, the tenth, or the eleventh aspect. In the above manufacturing method, the following steps (1)-(6) are performed in sequence:

the step (1) of fitting the bottomed tubular preform to the metal mold used for the blow molding with the mouth tubular portion being projected to outside in a state where a predetermined portion of the preform excluding the mouth tubular portion is heated to a temperature at which a stretching effect is achieved;

the step (2) of vertically stretching the preform by means of the stretching rod the step (3), performed together with the vertical stretching, of supplying the pressurized liquid from the mouth tubular portion into the preform via the introduction path so as to expandingly stretch the preform, thereby shaping the container in accordance with a shape of the cavity of the metal mold;

the step (4), after the container is shaped, of stopping the supply of the pressurized liquid;

the step (5) of supplying the pressurized air to the introduction path; and the step (6) of pressurizing the liquid remaining in the portion extending from the inside of the container to the introduction path by means of the pressurized air, thereby discharging the remaining liquid to outside via the horizontal hole of the stretching rod and the discharge path until a liquid surface of the liquid reaches the height position of the horizontal hole of the stretching rod.

A thirteenth aspect of the present invention resides in the blow molding device according to the first aspect, wherein the rod includes a stretching rod for vertically stretching the preform, and the container is shaped in accordance with the cavity of the metal mold by the vertical stretching by means of the stretching rod and by the expansion and stretching by means of the pressurized liquid, a means is provided for pulling up the tip portion of the stretching rod until the tip portion reaches from a position of the tip portion after the vertical stretching to a predetermined height position inside the container at predetermined timing after the vertical stretching by means of the stretching rod in a state where the supply of the pressurized liquid for the expansion and stretching is continued, a means is provided for disinserting the stretching rod from the container in a state where the supply of the pressurized liquid is stopped, at predetermined timing after the stretching rod is pulled up, and according to a shape and the height position to which the tip portion of the stretching rod is pulled up, the head space of the shaped container that is filled with the liquid is regulated to be the predetermined volume.

According to the device with the above structure, while the preform is vertically stretched by means of the stretching rod or after the vertical stretching is completed, the preform is expandingly stretched by means of the pressurized liquid so as to be shaped into the container. The vertical stretching is uniformly performed without so-called core misalignment while the stretching rod is abutted against a middle portion of a bottom wall of the preform, and therefore, the shaping of the container is achieved in a stable manner.

On the other hand, after the shaping of the container, the stretching rod inserted into the container occupies a significant volume in the shaped container. The above leads to a problem that, when the stretching rod is pulled out of the container in the state where the container is shaped by means of the pressurized liquid at the final stage of blow molding and then the supply of the liquid is stopped, the inside of the container is placed under significantly reduced pressure and that the shaped container is deformed such that the volume of the container is reduced.

In view of the above, according to the blow molding device with the above structure, the tip portion of the stretching rod is pulled out until the tip portion reaches from the position of the tip portion after the vertical stretching to the predetermined height position inside the container in the state where the supply of the liquid with respect to the expansion and stretching by means of the pressurized liquid is continued. The pressurized liquid is filled to the inside of the container by an amount corresponding to the degree to which the stretching rod is displaced upward. Accordingly, while volume reduction and deformation of the container as a result of the pulling-up of the stretching rod is prevented, the shaping of the container in accordance with the cavity of the metal mold is completed. Furthermore, dwelling and cooling are performed by the pressurized liquid pressing a circumferential wall of the container against the cavity of the metal mold.

Moreover, according to the above structure with the means for disinserting the stretching rod from the container in the state where the supply of the pressurized liquid is stopped at the predetermined timing after the stretching rod is pulled up, by letting a predetermined volume, that is, a volume to be filled in a final container, of the pressurized liquid remain in a region extending from the introduction path provided in the nozzle to the inside of the container in the state where the supply of the liquid is stopped and by disinserting or pulling out the tip portion of the stretching rod from the container in the above state, all the liquid remaining in the introduction path is flowed into the container without being scattered to the surrounding outside. As a result, the volume of the head space is reproducibly regulated.

Even when it is needed to vary, for a single container, the head space according to products or when containers with different shapes are molded, this need is met easily without significantly changing the device, simply by changing the shape of the tip portion of the stretching rod or by changing the insert position of the tip portion at the time of pulling-up, for example.

Here, as described above, the timing at which the stretching rod is pulled up to the predetermined height position and the regulation for the height position of the tip portion of the stretching rod after the pulling-up are particularly important elements with respect to moldability, property after molding, and the regulation of the head space of the container.

By providing the servo mechanism using the servo motor, operations of starting to pull up the stretching rod at the predetermined timing and of stopping the pulling-up at the predetermined position may be controlled with high precision.

Furthermore, by monitoring the height position of the stretching rod and by monitoring a pressure of the liquid in the introduction path, for example, it is possible to detect the predetermined timing at which the pulling-up and the disinsertion of the stretching rod are to be started based on variation patterns of the height position and the pressure.

By linking such a mechanism for monitoring the height position of the stretching rod and monitoring the pressure of the liquid with the servo mechanism for controlling the displacement of the stretching rod, for example, the means for pulling up the stretching rod to the predetermined height position at the predetermined timing and the means for disinserting the stretching rod at the predetermined timing in the state where the supply of the liquid is stopped may be configured.

Additionally, with the structure of the above device, as described above, while the preform is vertically stretched by means of the stretching rod or after the vertical stretching is completed, the preform is expandingly stretched by means of the pressurized liquid so as to be shaped into the container.

Regarding the vertical stretching by means of the stretching rod, in addition to the structure where the preform is stretched until the bottom wall of the preform is sandwiched between the tip portion of the stretching rod and a bottom wall of the metal mold, other structures are possible. For example, the preform may also be stretched halfway.

Moreover, the predetermined timing at which the tip portion of the stretching rod is pulled up from the position of the tip portion after the vertical stretching until the tip portion reaches the predetermined height position inside the container may be during the shaping of the container by expansion and stretching by means of the pressurized liquid, at the same time as the shaping is completed, after a predetermined time period after the shaping is completed, or the like, and is not particularly limited. The timing may be appropriately determined in consideration of blow moldability including productivity, presence of volume reduction and deformation, presence of residual strain in the molded container, uniformity of the circumferential wall, or the like.

A fourteenth aspect of the present invention resides in the blow molding device according to the thirteenth aspect, wherein, as in the first aspect, the blow nozzle is provided, at a tip thereof, with an engaging tubular piece configured to be engaged into the mouth tubular portion of the preform, the engaging tubular piece is provided, on an outer circumferential wall thereof, with a circumferential stepped portion whose diameter is decreased toward a tip thereof, and the blow nozzle is brought into the tight communication with the mouth tubular portion as a result of abutment between the circumferential stepped portion and an upper end surface of the mouth tubular portion via a seal member.

A fifteenth aspect of the present invention resides in the blow molding device according to the thirteenth or the fourteenth aspect, wherein a valve mechanism is provided in an end portion on a downstream side of the introduction path formed in the blow nozzle for allowing the introduction path to be opened and closed.

The above structure concerns a means for starting the supply of the liquid into the preform and for stopping the supply. By providing the valve mechanism in the end portion on the downstream side of the introduction path, that is to say, in a position fairly close to the mouth tubular portion of the preform, the liquid is supplied into the preform and stopped at predetermined timing with high precision.

Furthermore, in the manufacturing method of a container according to the present invention, as described below, the stretching rod is disinserted from the mouth tubular portion at the final stage of blow molding, and correspondingly, the liquid remaining in the introduction path flows into the container, whereby the head space in the molded container that is filled with the liquid is regulated to be the predetermined volume.

With the above structure, when the introduction path for the liquid is in the closed state by means of the valve mechanism, measurement is performed while an amount of the liquid remaining in a portion of the introduction path that extends from the position at which the valve mechanism is provided to an upper end of the mouth tubular portion of the preform is reduced. As a result, the head space is controlled with even higher precision.

A sixteenth aspect of the present invention resides in the blow molding device according to the fifteenth aspect, wherein a tubular rod-shaped shaft body is displaceably inserted and disposed in the blow nozzle along an axis direction of the blow nozzle, and the stretching rod is inserted in the shaft body such that the stretching rod is slidable in a liquid tight manner, the shaft body and the stretching rod constituting a seal pin, and the valve mechanism is configured by bringing and releasing a tip portion of the seal pin into and from the abutment against a seal stepped portion provided on an inner circumferential surface of the blow nozzle.

The above structure concerns a concrete example of the valve mechanism provided in the lower end portion in the blow nozzle. By an operation of displacing the rod-shaped seal pin that is inserted and disposed displaceably along an axis direction of the blow nozzle, the introduction path may be easily opened and closed. Here, the tubular rod-shaped shaft body and the stretching rod inserted in the shaft body are independently displaceable in the upward and downward directions, and similarly to the aforementioned stretching rod, it is possible to control the shaft body to start to be displaced upward and downward and to be stopped with high precision by means of the servo mechanism using the servo motor.

In combination with the fact that the valve mechanism is provided in the position fairly close to the mouth tubular portion of the preform, the supply of the liquid into the preform is started and stopped at the predetermined timing with high precision.

A seventeenth aspect of the present invention resides in a manufacturing method of a synthetic resin container with use of the blow molding device of the thirteenth, the fourteenth, the fifteenth, or the sixteenth aspect, including: the metal mold used for blow molding; the blow nozzle that is in the tight communication with the mouth tubular portion of the bottomed tubular preform; the stretching rod that is inserted in the blow nozzle; and the pressurized liquid supply unit configured to supply the pressurized liquid into the preform via the introduction path provided in the blow nozzle, wherein the container is shaped along the cavity of the metal mold by the vertical stretching by means of the stretching rod and by the expansion and stretching by means of the pressurized liquid.

In the above blow molding method, the steps described in (1)-(3) below are performed in sequence, so as to regulate the head space in the molded container that is filled with the liquid is regulated to be the predetermined volume:

the step 1 of supplying the pressurized liquid from the mouth tubular portion into the preform via the introduction path formed in the blow nozzle while the preform is vertically stretched by means of the stretching rod or after the vertical stretching is completed, thereby expandingly shaping the container in accordance with a shape of the cavity of the metal mold;

the step 2 of pulling up the tip portion of the stretching rod until the tip portion reaches from the position of the tip portion after the vertical stretching to the predetermined height position inside the container at the predetermined timing after the vertical stretching by means of the stretching rod in the state where the supply of the pressurized liquid for the expansion and stretching is continued; and the step 3 of stopping the supply of the pressurized liquid and disinserting the stretching rod from the container at the predetermined timing after the tip portion of the stretching rod reaches the predetermined height position and after the shaping of the container is completed.

With the structure of the above manufacturing method,

The container is shaped by means of the pressurized liquid while the preform is vertically stretched by means of the stretching rod or after the vertical stretching is completed.

Regarding the vertical stretching by means of the stretching rod, in addition to the structure where the preform is stretched until the bottom wall of the preform is sandwiched between the tip portion of the stretching rod and the bottom wall of the metal mold, other structures are possible. For example, the preform may also be stretched halfway.

Moreover, the timing at which the tip portion of the stretching rod is pulled up from the position of the tip portion after the vertical stretching until the tip portion reaches the predetermined height position inside the container may be during the shaping of the container by expansion and stretching by means of the pressurized liquid, at the same time as the shaping is completed, after a predetermined time period after the shaping is completed, or the like, and is not particularly limited. The timing may be appropriately determined in consideration of blow moldability including productivity, presence of volume reduction and deformation, presence of residual strain in the molded container, uniformity of the circumferential wall, or the like.

An eighteenth aspect of the present invention for solving the aforementioned problems resides in a manufacturing method of a synthetic resin container according to the seventeenth aspect, wherein after the vertical stretching by means of the stretching rod, a middle portion of a bottom wall of the vertically stretched preform is sandwiched between the tip portion of the stretching rod and a bottom wall of the metal mold.

The bottom wall of the preform is sandwiched between the tip portion of the stretching rod and the bottom wall of the metal mold, and accordingly, the position of the vertically stretched preform is maintained in a more stable manner without so-called core misalignment. As a result, the shaping of the container is achieved in a more stable manner.

A nineteenth aspect of the present invention resides in the manufacturing method of a synthetic resin container according to the seventeenth or the eighteenth aspect, wherein a valve mechanism is provided in an end portion on a downstream side of the introduction path formed in the blow nozzle for allowing the introduction path to be opened and closed, the valve mechanism being configured to control the liquid to be supplied into the preform or into the container or to be stopped.

Advantageous Effects of Invention

The blow molding device according to the first aspect of the present invention has the aforementioned structure.

Accordingly, by disinserting or pulling out the tip portion of the rod from the container after the container is shaped, correspondingly, all the liquid remaining in the introduction path is flowed into the container without being scattered from the mouth tubular portion to the surrounding outside. Thus, the volume of the head space is reproducibly regulated.

That is to say, the blow nozzle is disengaged from the mouth tubular portion in the state where all the liquid is flowed into the container and where the head space is formed in the upper portion of the container. Accordingly, the problem of the liquid being scattered to the surrounding outside in conjunction with the disengagement of the blow nozzle is solved, and the volume of the head space is reproducibly regulated.

Even when it is needed to vary, for a single container, the head space according to products or when containers with different shapes are molded, this need is met easily without significantly changing the device, simply by changing the shape of the tip portion of the rod or by changing the degree of insertion of the tip portion, for example.

Furthermore, in the blow molding device including the blow nozzle that includes the circumferential wall in which the vent hole is provided in the openable and closable manner, when the rod is disinserted from the container after the container is shaped and the supply of the pressurized liquid is stopped, the vent hole is switched to the open state for bringing the outside of the blow nozzle into communication with the inside of the blow nozzle. By doing so, the reduced pressure state in the container resulted from the disinsertion of the rod is mitigated. As a result, deformation of the container due to reduced pressure is effectively prevented.

The blow molding device according to the eighth aspect of the present invention has the aforementioned structure.

In the state where the bottomed cylindrical preform is biaxially stretched and blown by means of the stretching rod and the pressurized liquid and where the container is shaped, the liquid remaining in the portion extending from the inside of the container to the introduction path is pressurized by the pressurized air supplied to the introduction path. By doing so, the part of the remaining liquid is discharged via the horizontal hole provided in the stretching rod and the discharge path.

Furthermore, the discharge of the liquid spontaneously stops when the liquid surface is lowered to the height position at which the horizontal hole is located, and therefore, the liquid surface of the liquid is regulated to the height position at which the horizontal hole is located easily, reproducibly, and reliably.

With the above advantageous effects, the head space in the container that is filled with the content liquid at the time of molding is regulated to the predetermined volume.

The blow molding device according to the thirteenth aspect of the present invention has the aforementioned structure.

While the preform is vertically stretched by means of the stretching rod or after the vertical stretching is completed, the preform is expandingly stretched by means of the pressurized liquid so as to be shaped into the container. Accordingly, the vertical stretching is uniformly performed without so-called core misalignment while the stretching rod is abutted against the middle portion of the bottom wall of the preform, and therefore, the shaping of the container is achieved in the stable manner.

Furthermore, the tip portion of the stretching rod is pulled out until the tip portion reaches from the position of the tip portion after the vertical stretching to the predetermined height position inside the container in the state where the supply of the liquid for the expansion and stretching by means of the pressurized liquid is continued. The pressurized liquid is filled to the inside of the container by the amount corresponding to the degree to which the stretching rod is displaced upward. Accordingly, while volume reduction and deformation of the container as a result of the pulling-up of the stretching rod is prevented, the shaping of the container in accordance with the cavity of the metal mold is completed. Furthermore, dwelling and cooling are performed by the pressurized liquid pressing the circumferential wall of the container against the cavity of the metal mold.

Then, after the container is shaped, the tip portion of the stretching rod that is pulled up until the tip portion reaches the predetermined height position is disinserted or pulled out from the container. By doing so, correspondingly, all the liquid remaining in the introduction path is flowed into the container without being scattered from the mouth tubular portion to the surrounding outside. Thus, the volume of the head space is reproducibly regulated.

DESCRIPTION OF EMBODIMENTS

Embodiments of the present invention are described below with reference to the drawings.

Figure 1:
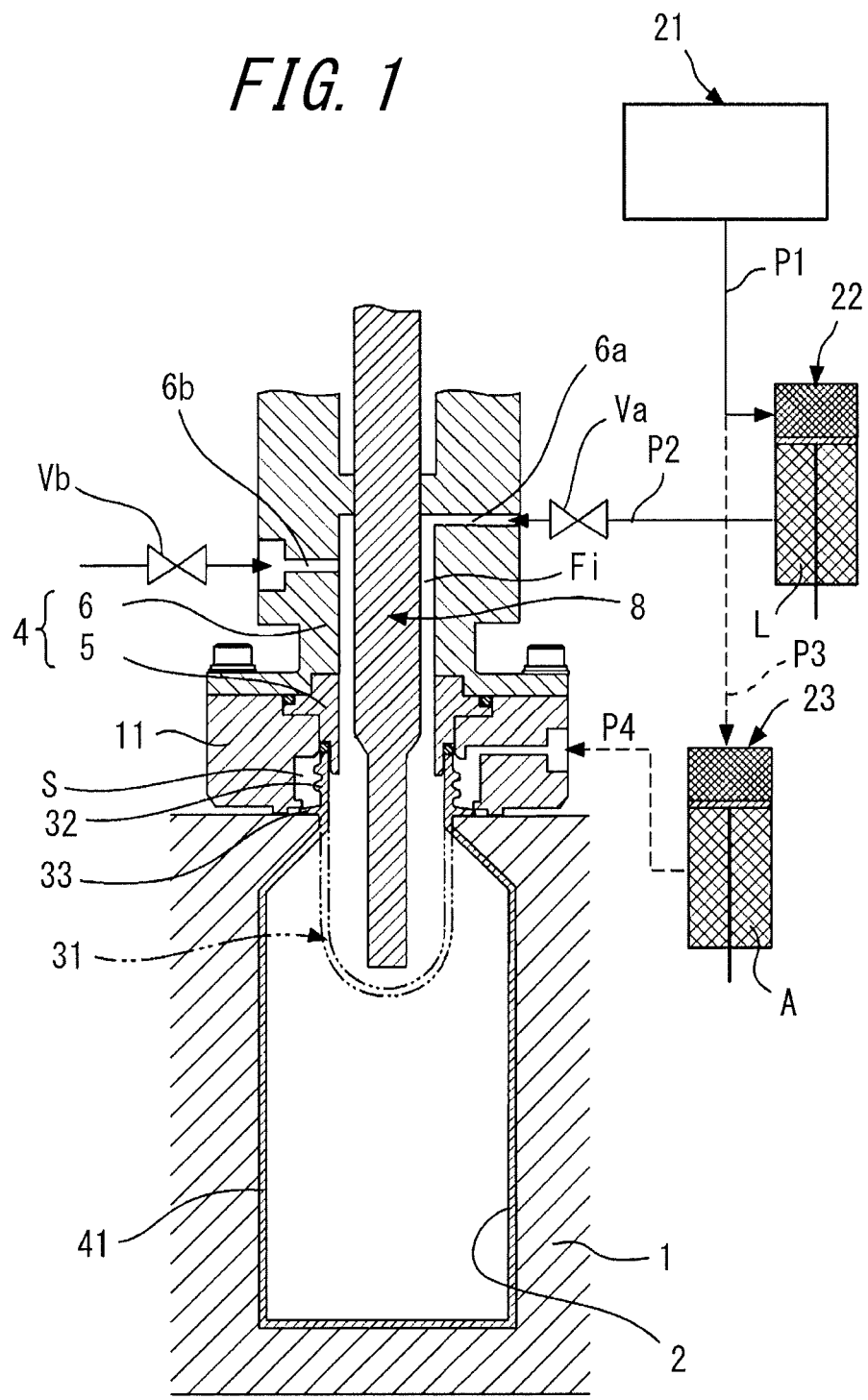
FIG. 1 is a schematic view illustrating one example of an overall structure of a blow molding device according to the present invention (a first embodiment)

FIG. 1 is a schematic view illustrating a blow molding device according to a first embodiment of the present invention. In the figure, a preform 31 being fitted to a metal mold 1 is indicated by a two-dot chain line, and a container 41 in the form of a bottle body that is molded from the preform 31 is indicated by a solid line.

The entire preform 31 used has a bottomed cylindrical test tube shape. The preform 31 includes a mouth tubular portion 32 standing from an upper end portion thereof, and the mouth tubular portion 32 is provided, in a lower end portion thereof, with a neck ring 33. The preform 31 is fitted in the metal mold 1, with the mouth tubular portion 32 being projected to the outside (upward in FIG. 1).

A part of the device includes the metal mold 1, a partition wall member 11, and a blow nozzle 4 and also includes, as auxiliary equipment, a pressurizing device 21, a pressurized liquid supply unit 22, and a pressurized air supply unit 23.

Figure 4:
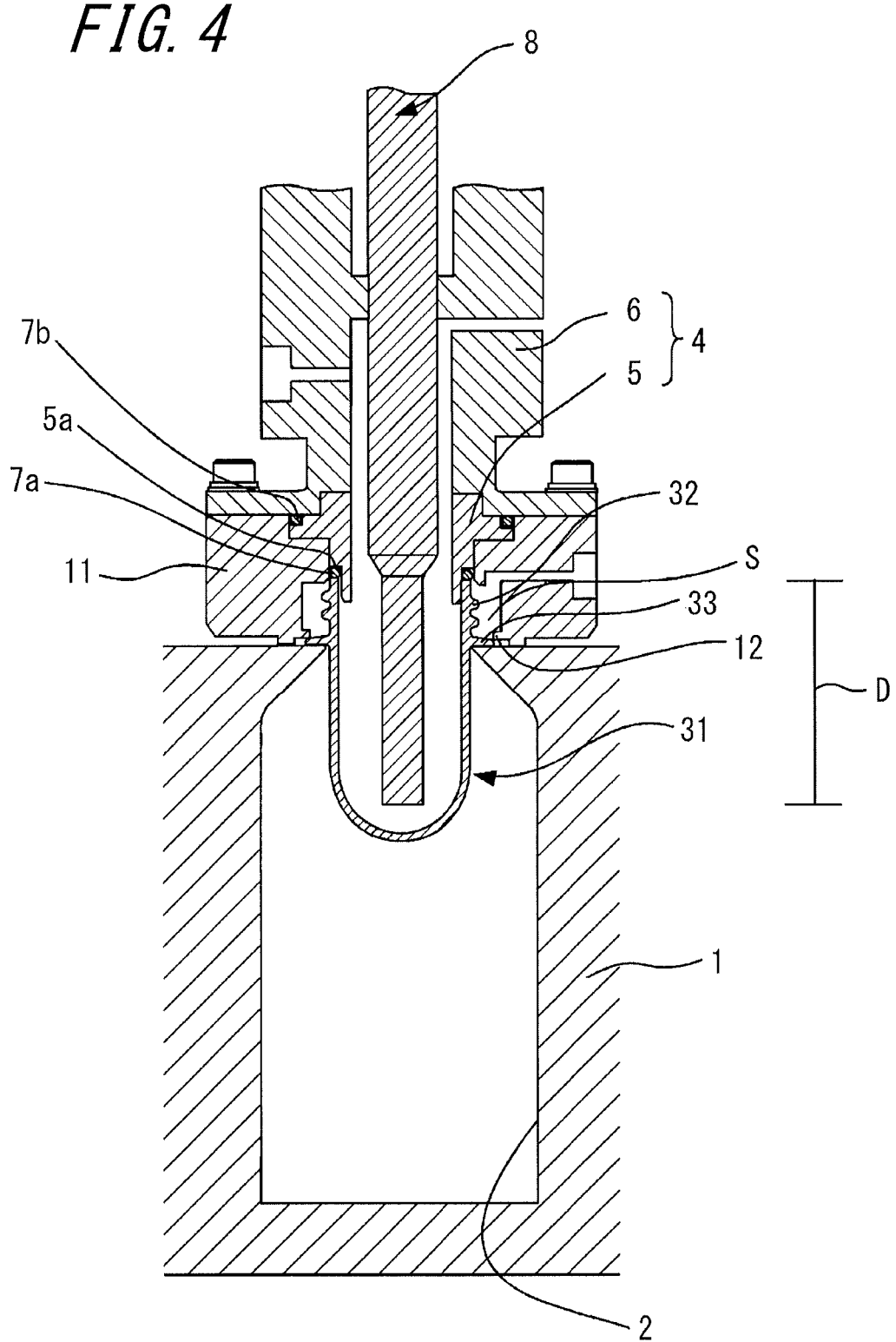
FIG. 4 is a sectional view illustrating a state where a tip portion of a rod is inserted into the preform in the molding process by means of the device illustrated in FIG. 1.

With reference also to FIG. 4 illustrating substantially the same state as FIG. 1, the part of the device is further described. The partition wall member 11 is provided above the metal mold 1 such that the partition wall member 11 surrounds an outer circumferential surface of the mouth tubular portion 32 of the preform 31 projected upward of the metal mold 1 via space S. The partition wall member 11 also includes a support flange piece 12 provided around a lower end portion of the partition wall member 11, and the support flange piece 12 tightly abuts against the neck ring 33 from above so as to maintain a fitted position of the preform 31.

The blow nozzle 4 includes an engaging tubular piece 5 and a guiding tubular portion 6 which are tightly coupled by means of a seal member 7b.

The entire engaging tubular piece 5 has a tubular shape. The engaging tubular piece 5 includes a cylindrical hollow portion inside thereof and also includes a circumferential stepped portion 5a provided around an outer circumferential wall thereof, the circumferential stepped portion 5a having a diameter decreased toward a tip, as illustrated in FIG. 4. The cylindrical tip portion of the engaging tubular piece 5 is engaged into the mouth tubular portion 32 of the preform 31, and as a result of abutment between the circumferential stepped portion 5a and an upper end surface of the mouth tubular portion 32 via a seal member (an O-ring) 7a, the blow nozzle 4 and the mouth tubular portion 32 are coupled and brought into tight communication.

The entire guiding tubular portion body is constituted by a member including a cylindrical hollow portion inside thereof. As illustrated in FIG. 1, the guiding tubular portion 6 is formed and provided with a through path 6a serving as a path for supplying a pressurized liquid L such that the through path 6a traverses through a circumferential wall at a predetermined height position. Thus, the pressurized liquid L may be supplied or stopped by means of an electromagnetic valve Va.

In a position below the through path 6a, a vent hole 6 is also formed and provided for bringing an outside of the guiding tubular portion 6 into communication with an inside of the guiding tubular portion 6. The communication may be opened or closed by means of an electromagnetic valve Vb.

Although in the present embodiment the electromagnetic valve Va is provided in the through path 6a and the electromagnetic valve Vb is provided in the vent hole 6b, other types of valves may be, of course, provided.

Inside the blow nozzle 4 including the engaging tubular piece 5 and the guiding tubular portion 6 as described above, a cylindrical rod 8 is coaxially inserted and disposed for providing a function of regulating a fluid surface as described later.

The rod 8 is configured to be displaceable in upward and downward directions in the figure and also to be stoppable at a predetermined position with high precision, by means of a servo mechanism (which is not illustrated) using a servo motor. By means of the blow nozzle 4 and the rod 8, a cylindrical introduction path Fi is formed in the blow nozzle 4.

Next, the auxiliary equipment is described.

The pressurizing device 21 has been conventionally an indispensable device and is a large-sized device such as a pressurizing pump, a compressor, or the like.

From the pressurizing device 21, a pressurized liquid is supplied via a pipe P1 to the pressurized liquid supply unit 22 configured to supply the pressurized liquid L used for blow molding, and a pressurized liquid is also supplied via a pipe P3 to the pressurized air supply unit 23 configured to supply pressurized air A.

The pressurized liquid supply unit 22 and the pressurized air supply unit 23 are formed as a plunger pump which utilizes the pressurized liquid supplied from the pressurizing device 21 as a power source.

Needless to say, it is also possible to additionally provide a pressurizing device for the pressurized air supply unit 23 in consideration of the overall layout, ease of control, or the like of the device.

The pressurized liquid supply unit 22 and the pressurized air supply unit 23 may also be formed in the form of, for example, a cylinder with a built-in piston that includes two compartments instead of in the form of the illustrated plunger pump.

The pressurized liquid L supplied from the pressurized liquid supply unit 22 passes through the pipe P2 and the electromagnetic valve Va and then through the through path 6a provided in the guiding tubular portion 6 and the introduction path Fi provided to extend vertically, and the pressurized liquid L is supplied to an inside of the preform 31.

In the device illustrated in FIG. 1 the pressurized air supply unit 23 configured to supply the pressurized air A is provided. However, in a case where, when the pressurized liquid L is supplied to the preform 31, the mouth tubular portion 32 undergoes diameter increase and deformation due to pressure of the supplied pressurized liquid L, it is possible to effectively prevent such diameter increase and deformation by introducing the pressurized air A into the partition wall member 11 via a pipe P4 and pressurizing the space S surrounding the outer circumferential surface of the mouth tubular portion 32 of the preform 31.

Next, FIGS. 2-6 sequentially illustrate one example of a manufacturing method of a synthetic resin container with use of the device illustrated in FIG. 1 according to the present invention. With reference to FIGS. 2-6, a description is given of the manufacturing method of a synthetic resin container, namely, a blow molding method, according to the present invention.

In blow molding, the steps described in (1)-(5) below are performed in sequence.

Figure 2:
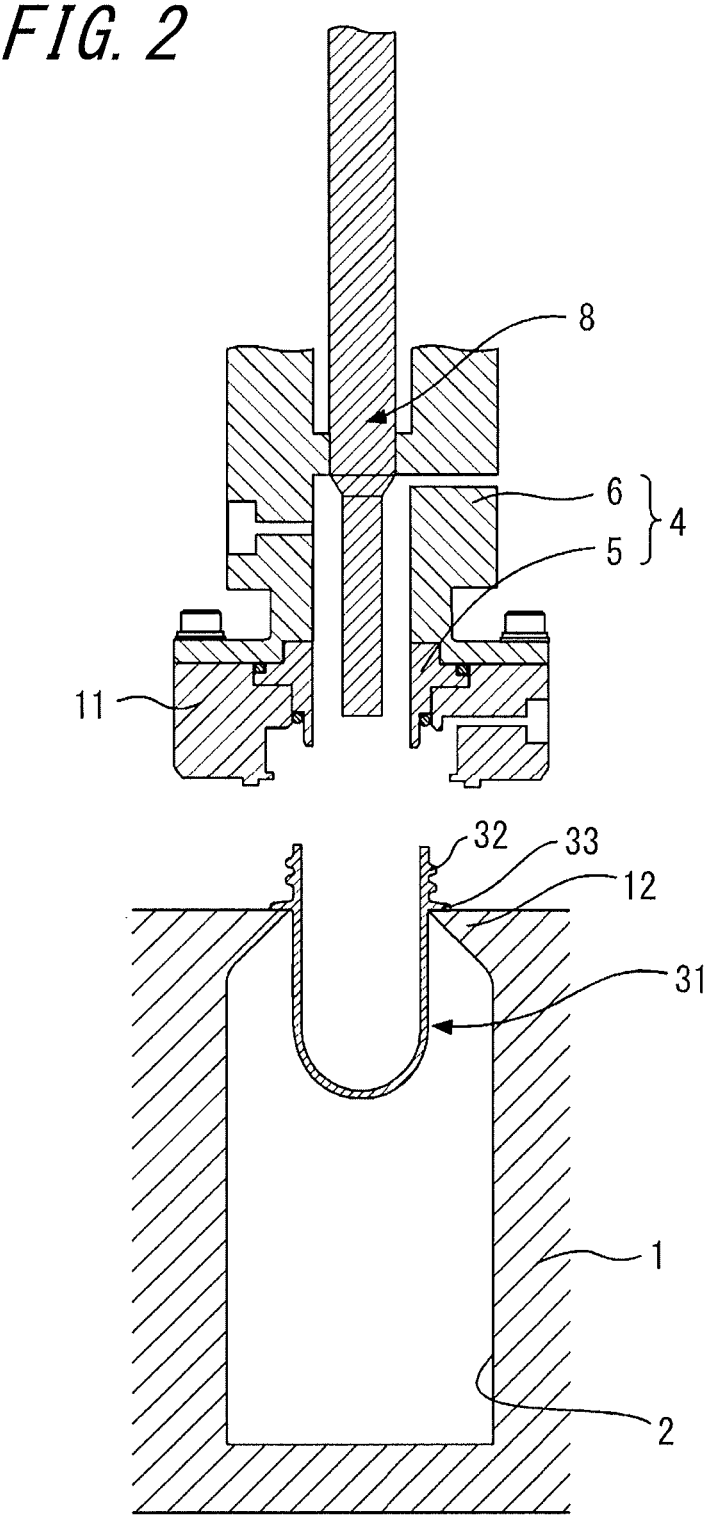
FIG. 2 is a sectional view illustrating a state where a preform is fitted to a metal mold in a molding process by means of the device illustrated in FIG. 1.

(1) As illustrated in FIG. 2, the preform 31 which, except for the mouth tubular portion 32, is heated to a temperature suitable for stretch blow molding is fitted to the metal mold 1 used for blow molding, with the mouth tubular portion 32 being projected upward, and mold closing is performed.

Figure 3:
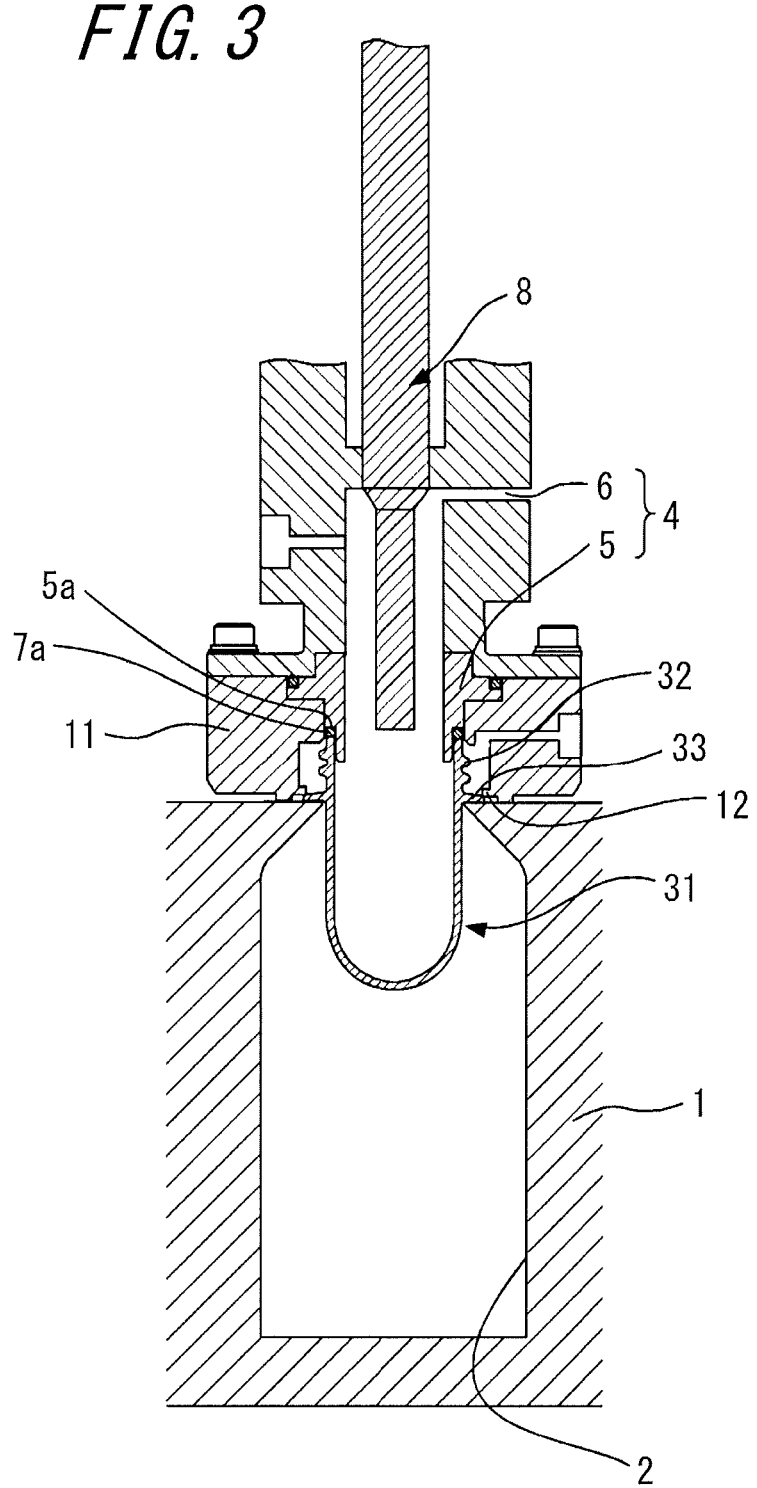
FIG. 3 is a sectional view illustrating a state where a blow nozzle is in communication with a mouth tubular portion of the preform in the molding process by means of the device illustrated in FIG. 1.

(2) As illustrated in FIG. 3, by displacing the partition wall member 11 and the blow nozzle 4, which are assembled and fixed, downward together with the rod 8 from above the mouth tubular portion 32, the tip portion of the engaging tubular piece 5 is engaged into the mouth tubular portion 32.

(3) Subsequently, as illustrated in FIG. 4, a tip portion of the rod 8 is inserted into the preform 31 over a predetermined distance D. (In the example illustrated in FIG. 4, the tip portion of the rod 8 is inserted even substantially to a bottom portion of the preform 31.)

Figure 5:
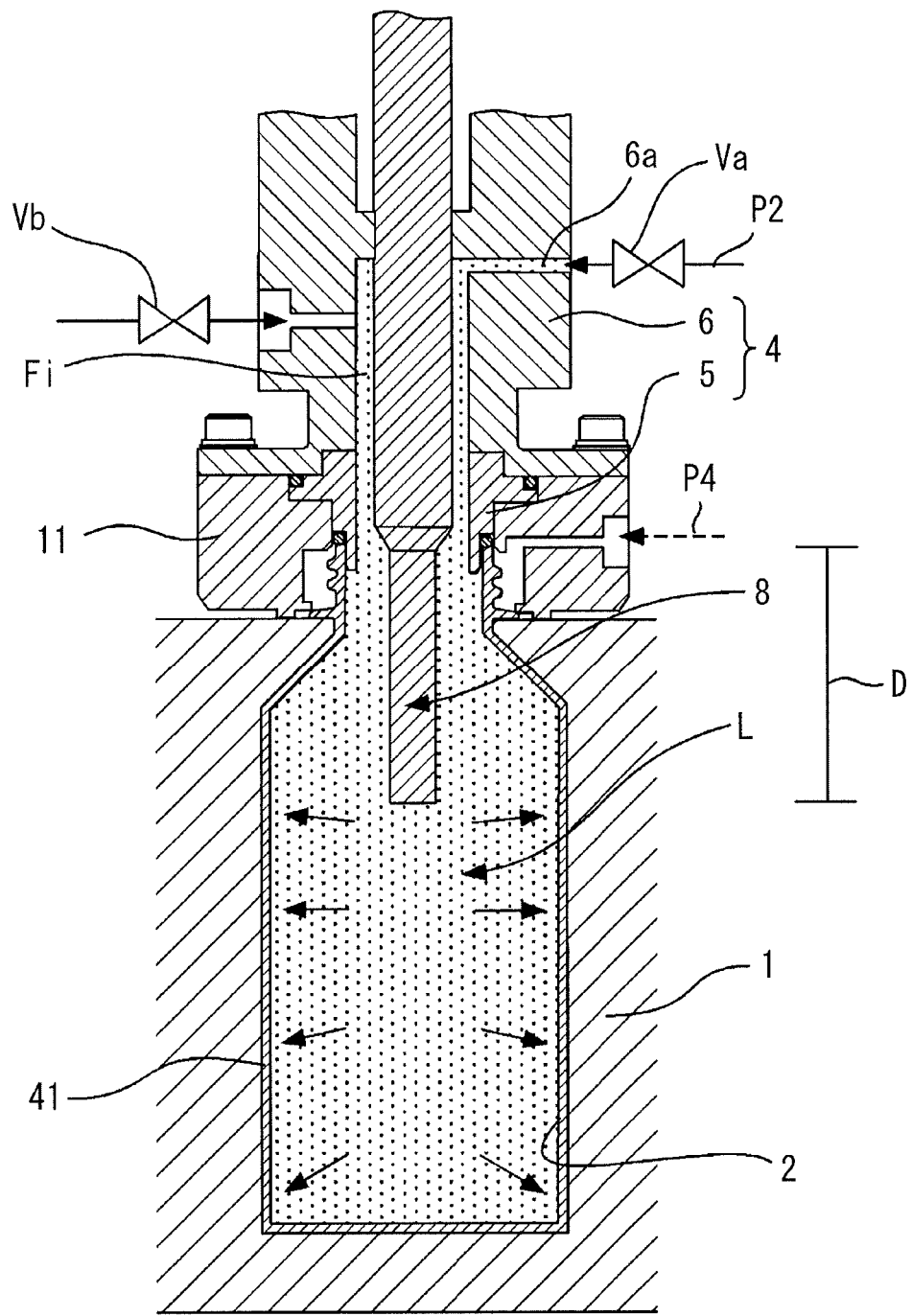
FIG. 5 is a sectional view illustrating a state where the preform is expandingly stretched by means of a pressurized liquid and where a container is shaped in the molding process by means of the device illustrated in FIG. 1.

(4) From the pressurized liquid supply unit 22 illustrated in FIG. 1 through the through path 6a provided in the guiding tubular portion 6 and through the flow inlet Fi, as illustrated in FIG. 5, the pressurized liquid L is supplied into the preform 31. By doing so, the preform 31 is expandingly stretched, and the container 41 is shaped in accordance with a cavity 2 of the metal mold 1.

(5) After the container 41 is shaped as described above, the supply of the pressurized liquid L is stopped by switching the electromagnetic valve Va into a closed state. Then, as illustrated in FIG. 6, the tip portion of the rod 8 is disinserted from the container 41 and pulled up to a position illustrated in FIG. 3.

Then, the partition wall member 11 and the blow nozzle 4, which are assembled and fixed, are displaced upward above the mouth tubular portion 32 to a position illustrated in FIG. 2. Furthermore, the metal mold 1 is opened and the container 41 filled with the liquid L is extracted, and the mouth tubular portion 32 is sealed with a cap (which is not illustrated) to obtain a product.

Figure 6:
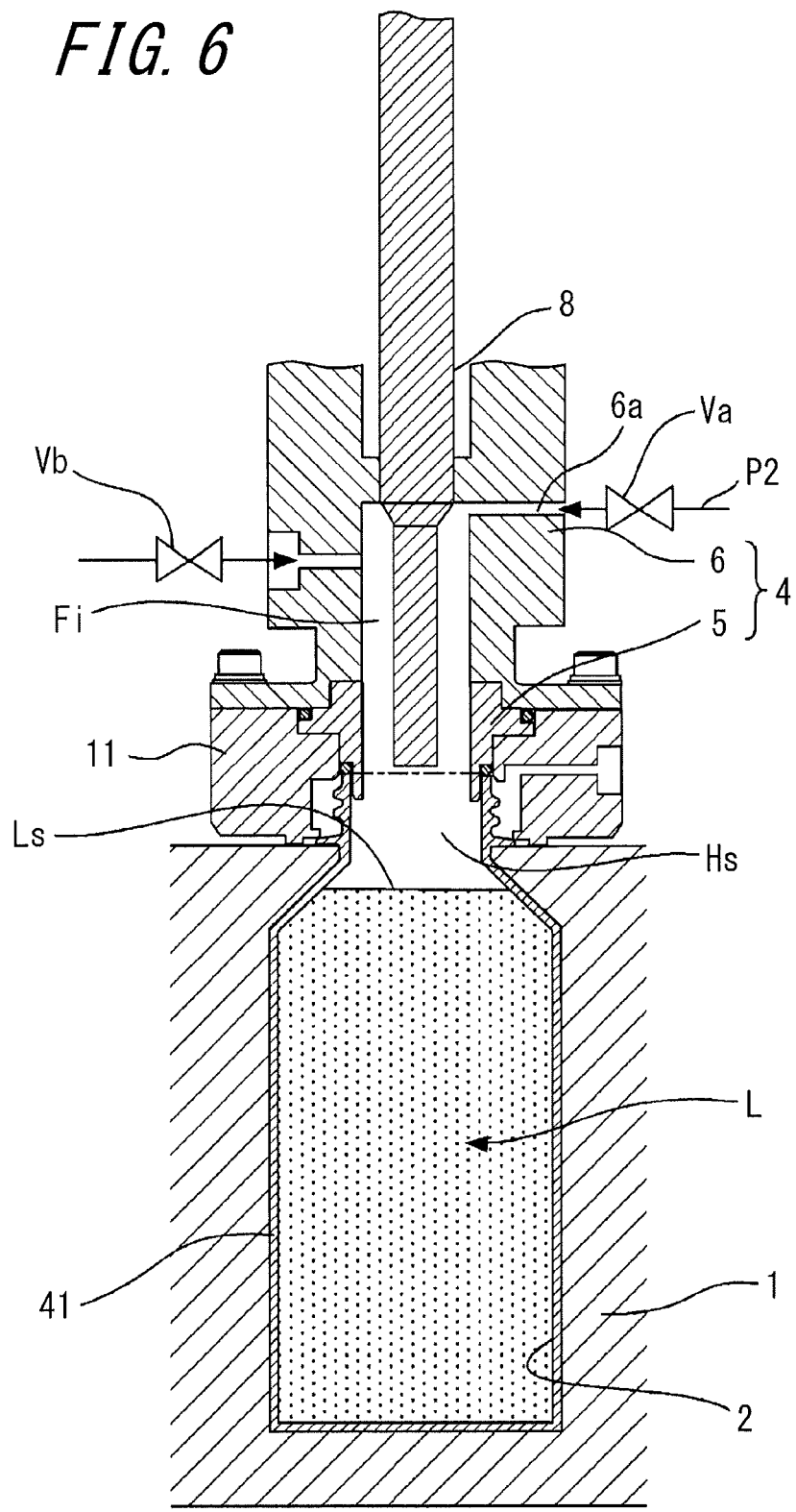
FIG. 6 is a sectional view illustrating a state where the rod is disinserted from the state illustrated in FIG. 5.

In the step (5) transitioning from the state illustrated in FIG. 5 to the state illustrated in FIG. 6, in conjunction with the disinsertion of the tip portion of the rod 8, all of the liquid L remaining in the introduction path Fi flows into the container 41, and a liquid surface Ls is lowered in the container 41. As a result, as illustrated in FIG. 6, in a state where the disinsertion of the tip portion of the rod 8 is completed, head space may be regulated to be a predetermined head space Hs.

Furthermore, during the disinsertion operation of the tip portion of the rod 8 from the container 41 in the step (5), by switching the electromagnetic valve Vb to an open state and by bringing the introduction path Fi formed outside and inside of the blow nozzle 4 into communication with each other, a reduced pressure state in the container 41 resulted from the disinsertion of the rod 8 is mitigated. As a result, deformation of the container 41 due to reduced pressure is effectively prevented.

It is also possible to supply pressurized air from the outside to the inside via the electromagnetic valve Vb.

Figure 7:
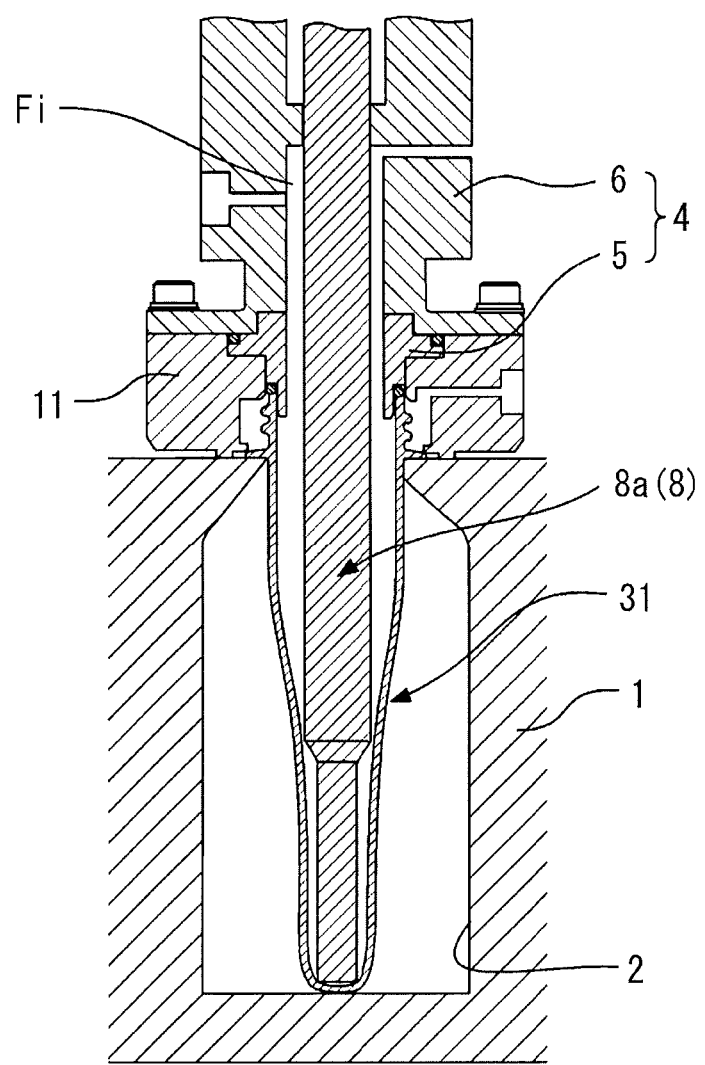
FIG. 7 is a sectional view illustrating a state where the preform is vertically stretched by a stretching rod in the molding process by means of the device illustrated in FIG. 1 that utilizes the stretching rod for vertically stretching the preform as a rod.

Next, FIG. 7 illustrates another example of a variation of the blow molding device and the manufacturing method according to the present invention. The figure schematically illustrates a step of vertical stretching in the manufacturing method of the container 41 by using a biaxially stretching blow molding device including a stretching rod 8a for vertically stretching the preform 31. In the example, the stretching rod 8a is used as the rod 8 that provides the function of regulating the head space Hs.

In the step (3) among the aforementioned steps (1)-(5), as illustrated in FIG. 4, the tip portion of the stretching rod 8a is inserted into the preform 31. Furthermore, as illustrated in FIG. 7, the preform 31 is vertically stretched by means of the stretching rod 8a. Subsequently, after a slight delay from the vertical stretching, the pressurized liquid L is supplied into the preform 31 vertically stretched in the step (4), so as to shape the container 41.

The step (4) of expansion and stretching by means of the pressurized liquid L may also be performed substantially simultaneously with the step of vertical stretching by means of the stretching rod 8a.

In a case of the above example, an insert position of the stretching rod 8a (the rod 8) reaches even a bottom portion of the container as can be seen from FIG. 7, and a distance of insertion is long. However, by regulating a diameter of the stretching rod 8a such as by setting the diameter more or less small correspondingly, the predetermined head space Hs set in advance may be achieved.

When the stretching rod 8a is used as the rod 8 for providing the function of regulating the head space Hs, in addition to the method described above where the stretching rod 8a is inserted to the bottom portion of the preform 31, and in this state, the pressurized liquid L is supplied so as to shape the container 41 and where, after the supply of the pressurized liquid L is stopped by switching the electromagnetic valve Va to the closed state, the tip portion of the stretching rod 8a is disinserted from the container 41, other methods may be adopted. In one method that may be adopted, after the container 41 is shaped, the stretching rod 8a is pulled up until the tip portion thereof reaches a predetermined height position in the container 41, and the pressurized liquid L is additionally supplied by an amount corresponding to the degree to which the stretching rod 8a is pulled up. Subsequently, the supply of the pressurized liquid L is stopped by switching the electromagnetic valve Va to the closed state, and after that, the tip portion of the stretching rod 8a is completely disinserted from the container 41. According to the one method as above, the need for setting the diameter of the stretching rod 8a to be particularly small is omitted.

Figure 8:
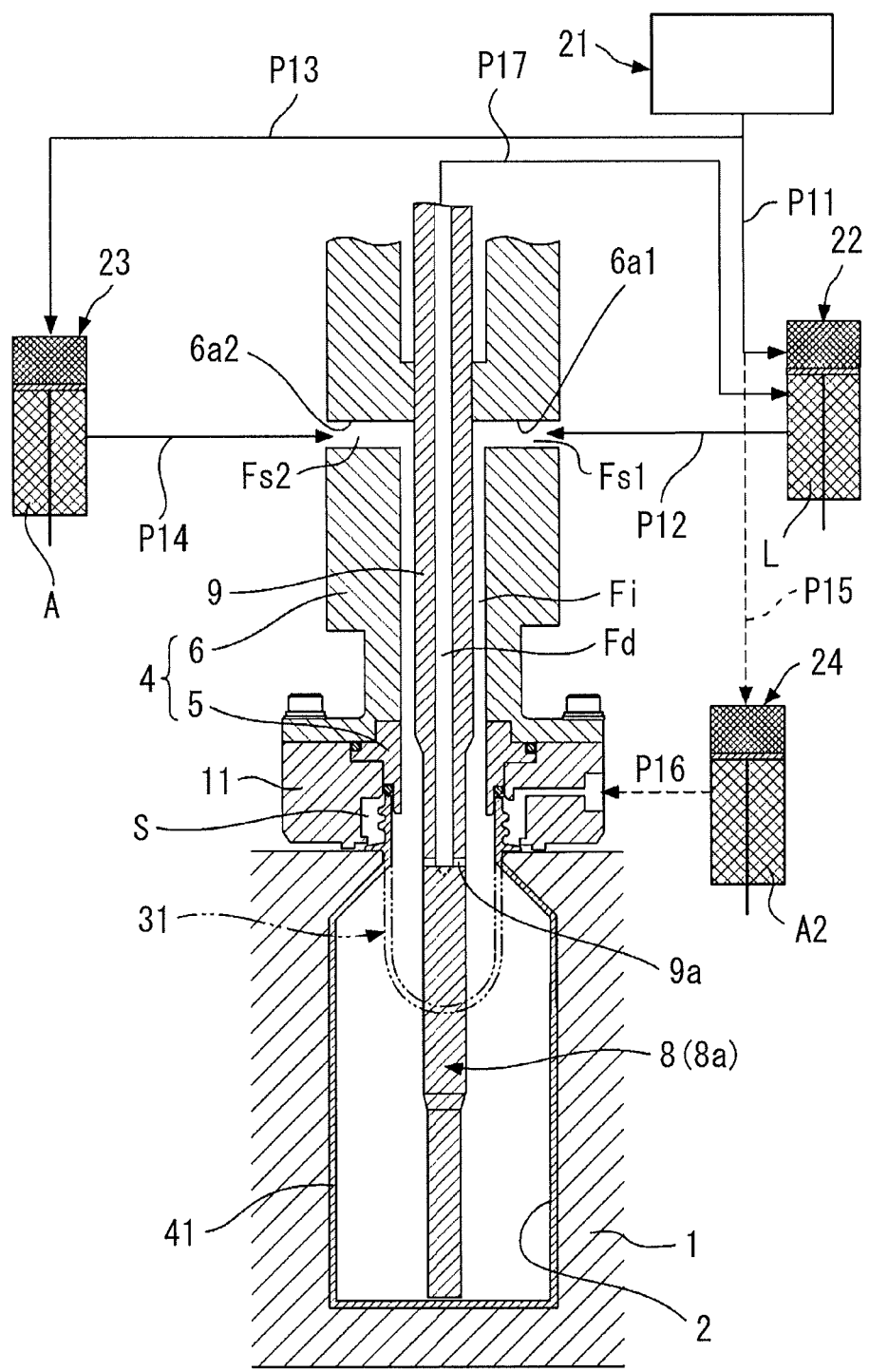
FIG. 8 is a schematic view illustrating one example of an overall structure of a blow molding device according to the present invention (a second embodiment)
Figure 9:
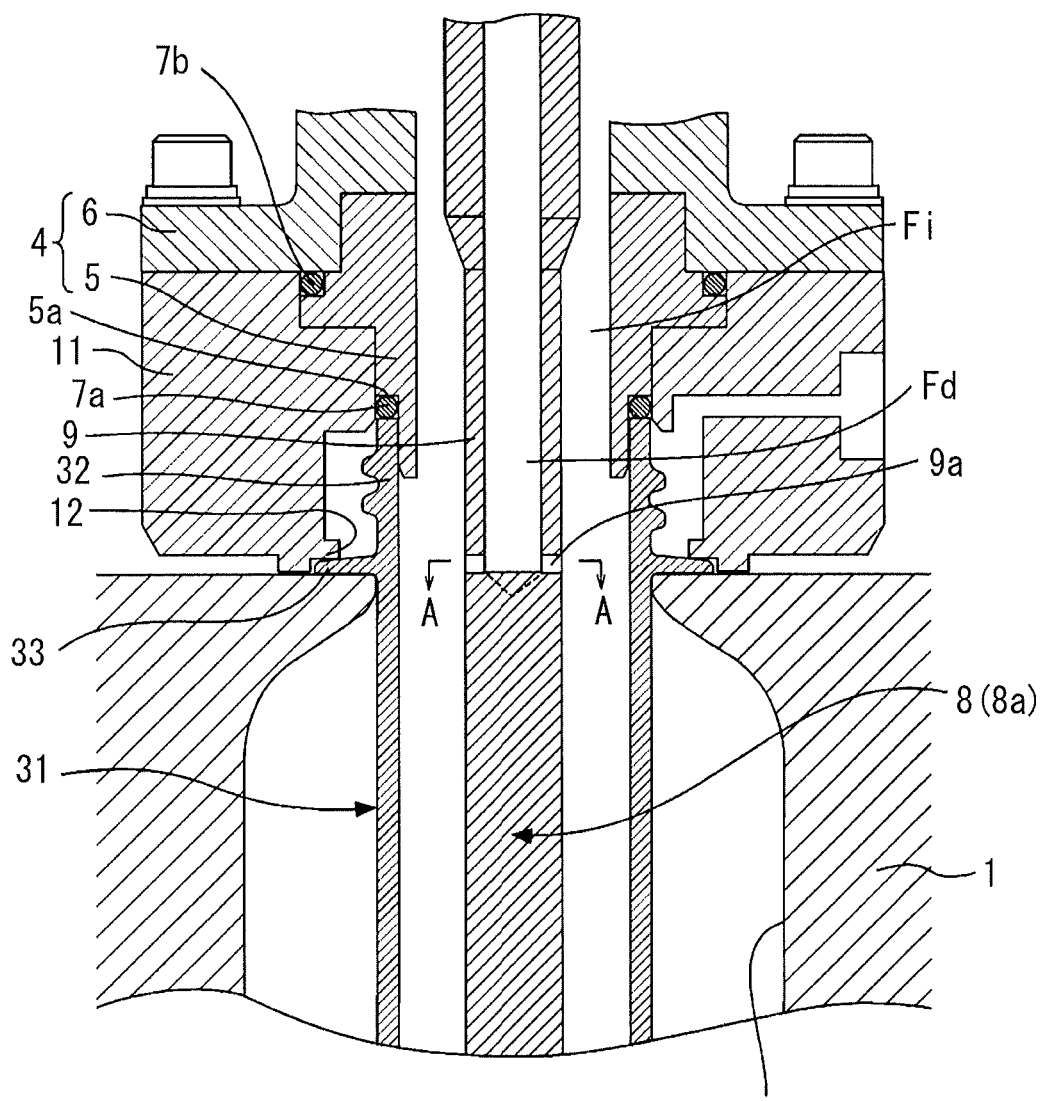
FIG. 9 is an enlarged sectional view of a part of the device illustrated in FIG. 8.
Figure 10:
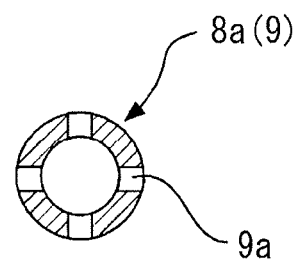
FIG. 10 is a sectional plan view of a stretching rod taken along a line A-A in FIG. 9.

FIGS. 8-10 illustrate a blow molding device according to a second embodiment of the present invention. FIG. 8 is a schematic view illustrating one example of an overall structure of the device, FIG. 9 is an enlarged sectional view of a part of the device illustrated in FIG. 8, and FIG. 10 is a sectional plan view of a stretching rod taken along a line A-A in FIG. 9.

In FIG. 8, the preform 31 being fitted to the metal mold 1 is indicated by a two-dot chain line, and a container 41 in the form of a bottle body that is molded from the preform 31 is indicated by a solid line. In FIG. 9, the preform 31 is indicated by a solid line.

A part of the device includes the metal mold 1, the partition wall member 11, and the blow nozzle 4 and also includes, as auxiliary equipment, the pressurizing device 21, the pressurized liquid supply unit 22, the pressurized air supply unit 23, and a second pressurized air supply unit 24.

The blow nozzle 4 includes the engaging tubular piece 5 and the guiding tubular portion 6 which are tightly coupled by means of the seal member 7b.

The entire guiding tubular portion 6 is constituted by a member including a cylindrical hollow portion inside thereof. The guiding tubular portion 6 is provided with a through hole 6a1 serving as a supply path Fs1 of the pressurized liquid L and is also provided with a through hole 6a2 serving as a supply path Fs2 of the pressurized air A such that the through holes 6a1 and 6a2 traverse through a circumferential wall at a predetermined height position.

The stretching rod 8a is coaxially inserted and disposed in the blow nozzle 4.

The entire stretching rod 8a has a cylindrical shape. The stretching rod 8a includes a tubular portion 9 in a portion extending form an upper end portion to a predetermined height position of the stretching rod 8a. The tubular portion 9 is provided inside thereof with a discharge path Fd provided to extend vertically. The tubular portion 9 also includes a lower end portion provided with horizontal holes 9a that extend through a tubular wall and communicate with the discharge path Fd and that are provided at four positions at an equal center angle interval as illustrated in the sectional plan view of FIG. 10.

Of course, a size and the number of the horizontal holes 9a may be appropriately determined in consideration of viscosity or the like of the liquid. By means of the blow nozzle 4 and the stretching rod 8a, the cylindrical introduction path Fi is formed in the blow nozzle 4.

Next, the auxiliary equipment is described.

From the pressurizing device 21, a pressurized fluid is supplied via a pipe P11 to the pressurized liquid supply unit 22 configured to supply the pressurized liquid L used for blow molding, is supplied via a pipe P13 to the pressurized air supply unit 23 configured to supply the pressurized air A, and also is supplied via a pipe P15 to the second pressurized air supply unit 24 configured to supply second pressurized air A2.

Similarly to the pressurized liquid supply unit 22 and the pressurized air supply unit 23 described earlier, the pressurized air supply unit 24 is formed in the form of a plunger pump which utilizes the pressurized liquid supplied from the pressurizing device 21 as a power source.

The second pressurized air supply unit 24 may be formed in the form of, for example, a cylinder with a built-in piston that includes two compartments instead of in the form of the illustrated plunger pump.

The pressurized liquid L supplied from the pressurized liquid supply unit 22 passes through the pipe P12 and then through the introduction path Fs1 provided in the introduction tubular portion 6 and the introduction path Fi provided to extend vertically, and the pressurized liquid L is supplied to the inside of the preform 31.

The pressurized air A supplied from the pressurized air supply unit 23 passes through the pipe P14 and through the supply path Fs2 provided in the introduction tubular portion 6 and then, the pressurized air A is supplied to the introduction path Fi.

As for the supply of the pressurized air A, it is also possible to supply the pressurized air A from the pressurizing device 21 directly to the introduction path Fi through the supply path Fs2 via the pipe P13 without using the pressurized air supply unit 23.

The liquid L discharged through the discharge path Fd provided in the stretching rod 8a is configured to be returned to the pressurized liquid supply unit 22 through the pipe P17 in a step described below.

Needless to say, depending on intended use, the discharged liquid L may also be separately collected or disposed of without being returned to the pressurized liquid supply unit 22.

In the device illustrated in FIG. 8 the second pressurized air supply unit 24 configured to supply the second pressurized air A2 is provided. However, in a case where, when the pressurized liquid L is supplied to the preform 31, the mouth tubular portion 32 undergoes diameter increase and deformation due to pressure of the supplied pressurized liquid L, it is possible to effectively prevent such diameter increase and deformation by introducing the second pressurized air into the partition wall member 11 via a pipe P16 and by pressurizing the space S surrounding the outer circumferential surface of the mouth tubular portion 32 of the preform 31.

Next, with reference to FIGS. 11-17, a description is given of a manufacturing method of a container in which a bottomed tubular preform is blow molded with use of the device illustrated in FIGS. 8-10 according to the second embodiment.

In blow molding, the steps described in (1)-(7) below are performed in sequence.

Figure 11:
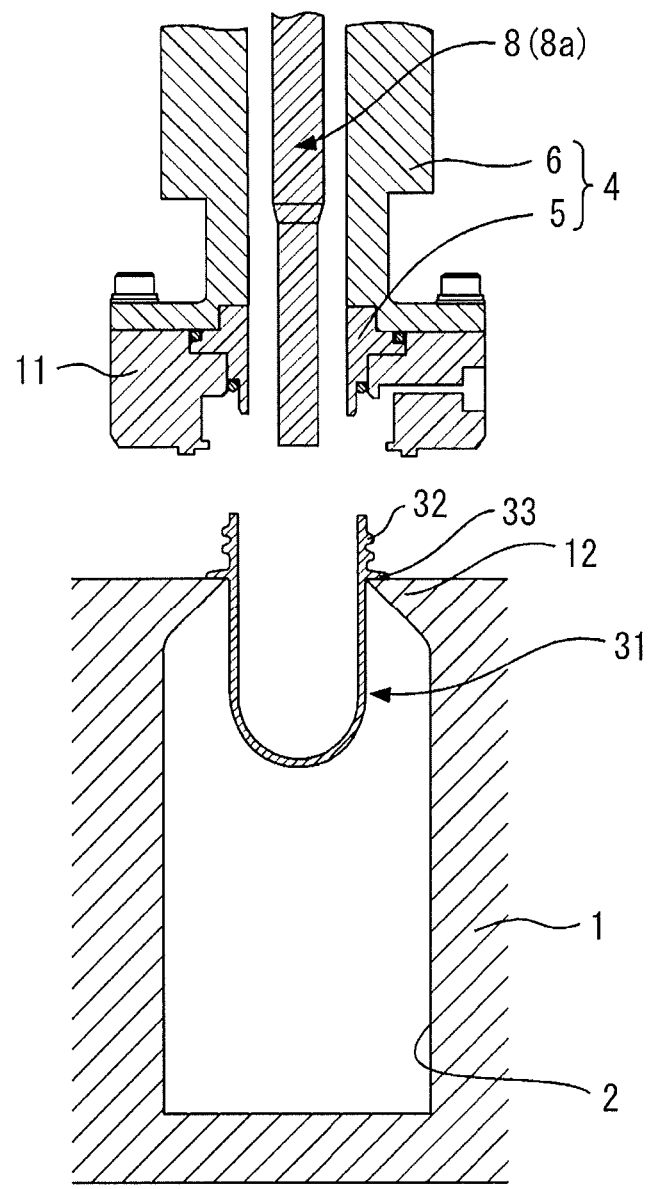
FIG. 11 is a sectional view illustrating a state where a preform is fitted to a metal mold in a molding process by means of the device illustrated in FIG. 8.

(1) As illustrated in FIG. 11, the preform 31 which, except for the mouth tubular portion 32, is heated to a temperature suitable for biaxially stretch blow molding is fitted to the metal mold 1 used for blow molding, with the mouth tubular portion 32 being projected upward, and mold closing is performed.

Figure 12:
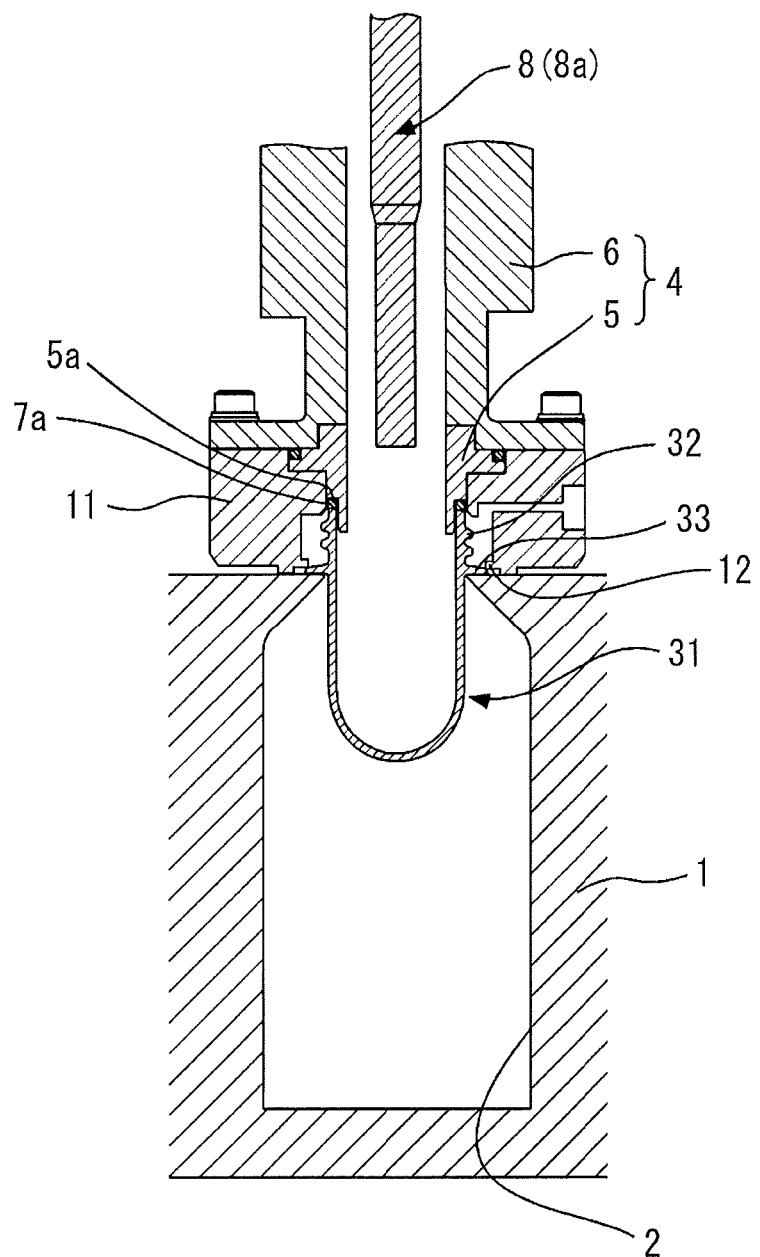
FIG. 12 is a sectional view illustrating a state where a blow nozzle is in communication with a mouth tubular portion of the preform in the molding process by means of the device illustrated in FIG. 8.

(2) As illustrated in FIG. 12, by displacing the partition wall member 11 and the blow nozzle 4, which are assembled and fixed, downward together with the stretching rod 8a from above the mouth tubular portion 32, the tip portion of the engaging tubular piece 5 is engaged into the mouth tubular portion 32.

Figure 13:
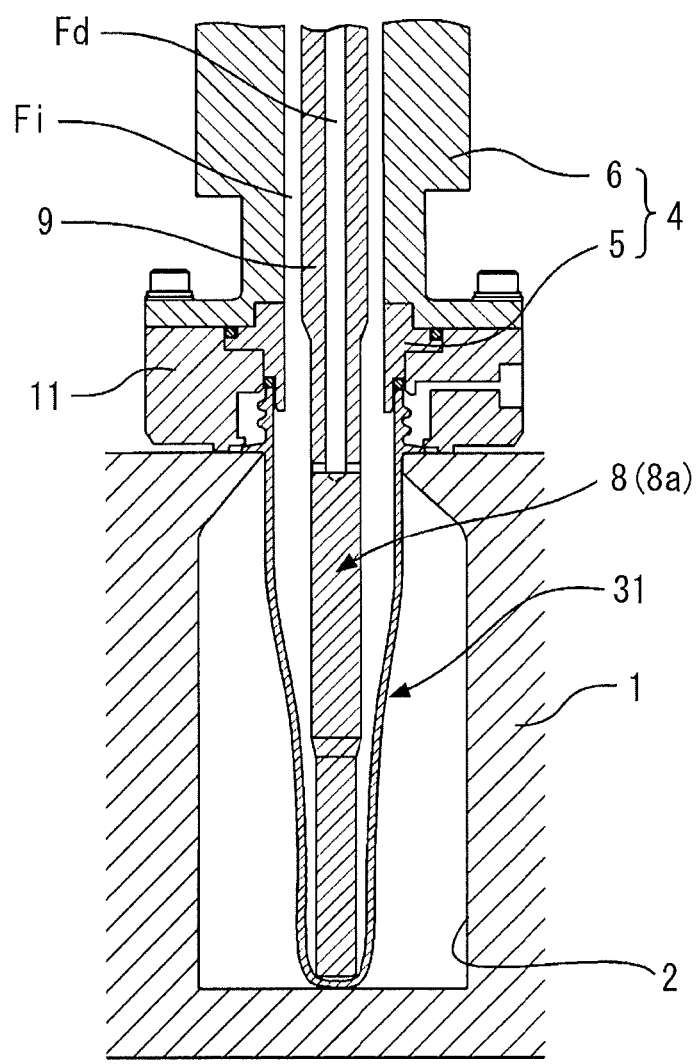
FIG. 13 is a sectional view illustrating a state where the preform is vertically stretched by a stretching rod in the molding process by means of the device illustrated in FIG. 8.

(3) Subsequently, as illustrated in FIG. 13, the preform 31 is vertically stretched by means of the stretching rod 8a.

Figure 14:
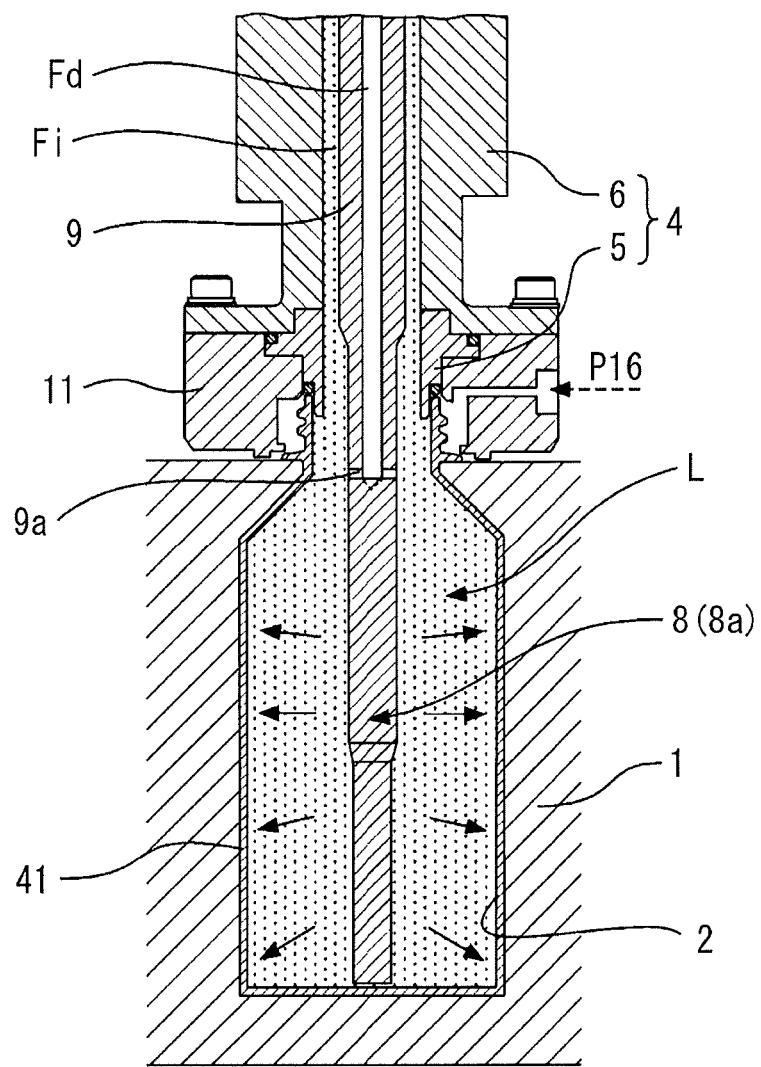
FIG. 14 is a sectional view illustrating a state where the preform is expandingly stretched by a pressurized fluid and where a container is shaped in the molding process by means of the device illustrated in FIG. 8.

(4) Simultaneously with or with a slight delay after the above vertical stretching, the pressurized liquid L is supplied from the pressurized liquid supply unit 22 illustrated in FIG. 8 into the preform 31 through the supply path Fs1 provided in the introduction tubular portion 6 and through the introduction path Fi as illustrated in FIG. 14. By doing so, the preform 31 is expandingly stretched, and the container 41 is shaped in accordance with the cavity 2 of the metal mold 1.

Figure 15:
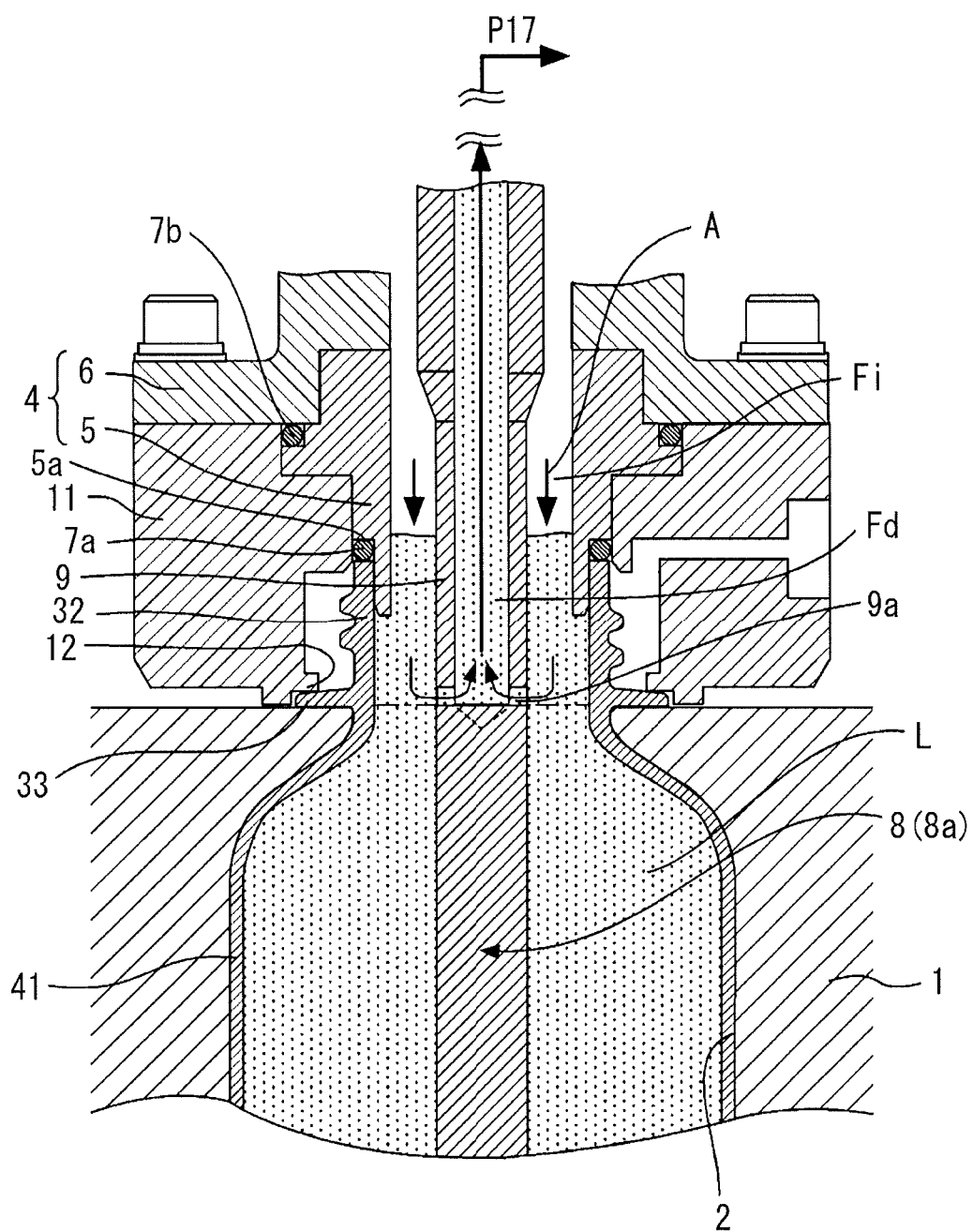
FIG. 15 is a sectional view illustrating how a part of the liquid is discharged by pressurized air in the molding process by means of the device illustrated in FIG. 8.

(5) Subsequently, after the container 41 is shaped as described above, the supply of the pressurized liquid L is stopped. Subsequently, from the pressurized air supply unit 23 illustrated in FIG. 8 and through the supply path Fs2 provided in introduction tubular portion 6, the pressurized air A is supplied from above the introduction path Fi as illustrated in FIG. 15. Due to pressure of the pressurized A, the liquid L remaining in a portion extending from the inside of the container 41 to the introduction path Fi is pressurized, and a part of the remaining liquid L is discharged to the outside through the horizontal holes 9a provided in the stretching rod 8a and the discharge path Fd.

In the example illustrated in FIG. 15, the height position of the stretching rod 8a at which the horizontal holes 9a are formed is determined so that the horizontal holes 9a come to a height position corresponding to a lower surface of the neck ring 33 of the mouth tubular portion 32 that is indicated by an alternate long and short dash line in FIG. 15 in a state where the stretching rod 8a is displaced to a lower limit as illustrated in FIG. 14.

In the device illustrated in FIG. 8, the liquid L discharged through the discharge path Fd provided in the stretching rod 8a is configured to be returned to the pressurized liquid supply unit 22 through the pipe P17.

Figure 16:
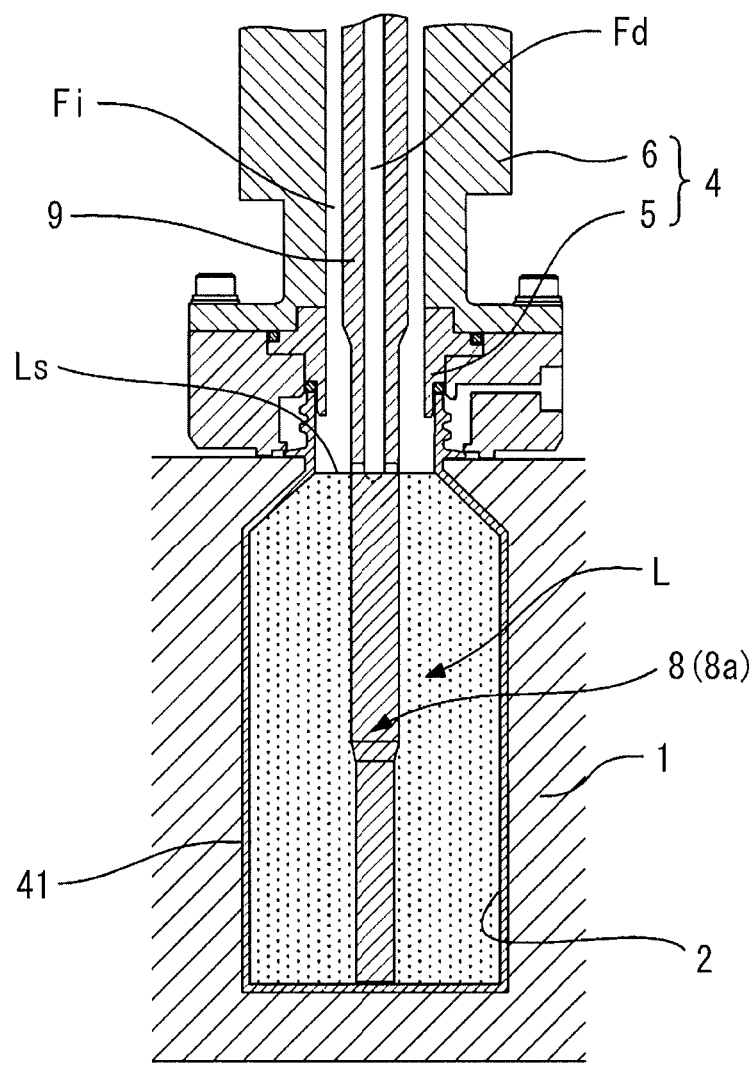
FIG. 16 is a sectional view illustrating a state where the discharge of the part of the liquid is completed in FIG. 15.

(6) When the pressurization by means of the pressurized air A is continued, as illustrated in FIG. 16, the discharge of the liquid L lasts until the liquid surface Ls of the liquid L reaches a height position corresponding to the position of the horizontal holes 9a. When the liquid surface Ls is lowered to the above height position, the discharge of the liquid spontaneously stops.

Then, the supply of the pressurized air A is stopped.

Figure 17:
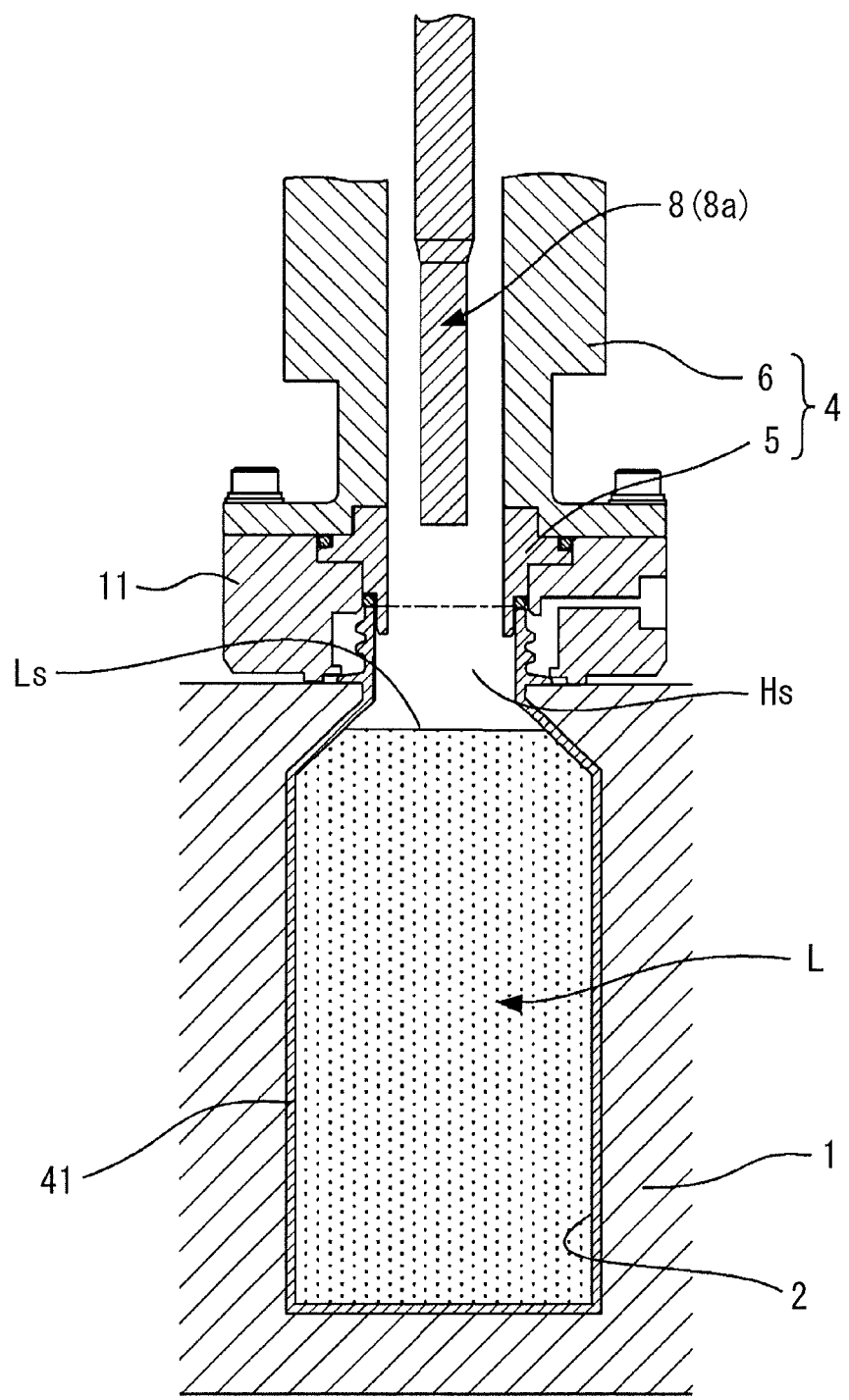
FIG. 17 is a sectional view illustrating a state where the stretching rod is displaced upward from the state illustrated in FIG. 16.

(7) Subsequently, as illustrated in FIG. 17, the stretching rod 8a is pulled up from the container 41. Furthermore, the partition wall member 11 and the blow nozzle 4, which are assembled and fixed, are displaced upward above the mouth tubular portion 32. Moreover, the metal mold 1 is opened to extract the container 41 filled with the liquid L, and the mouth tubular portion 32 is sealed with a cap (which is not illustrated) to obtain a product.

At this time, the liquid surface Ls is lowered by a distance corresponding to the degree to which the stretching rod 8a is pulled up. As a result, the predetermined head space Hs set in advance is achieved.

FIGS. 18-23 illustrate a blow molding device and a manufacturing method of a synthetic resin container with use of the blow molding device. In the following, with reference mainly to FIGS. 18 and 19, a description is given of one example of an overall structure of a blow molding device according to the present invention. Furthermore, with reference to FIGS. 18-23, a description is given of one example of a method for manufacturing a synthetic resin container with use of the blow molding device according to the present invention, namely, one example of steps of a blow molding method using a liquid as a pressure medium.

Figure 18:
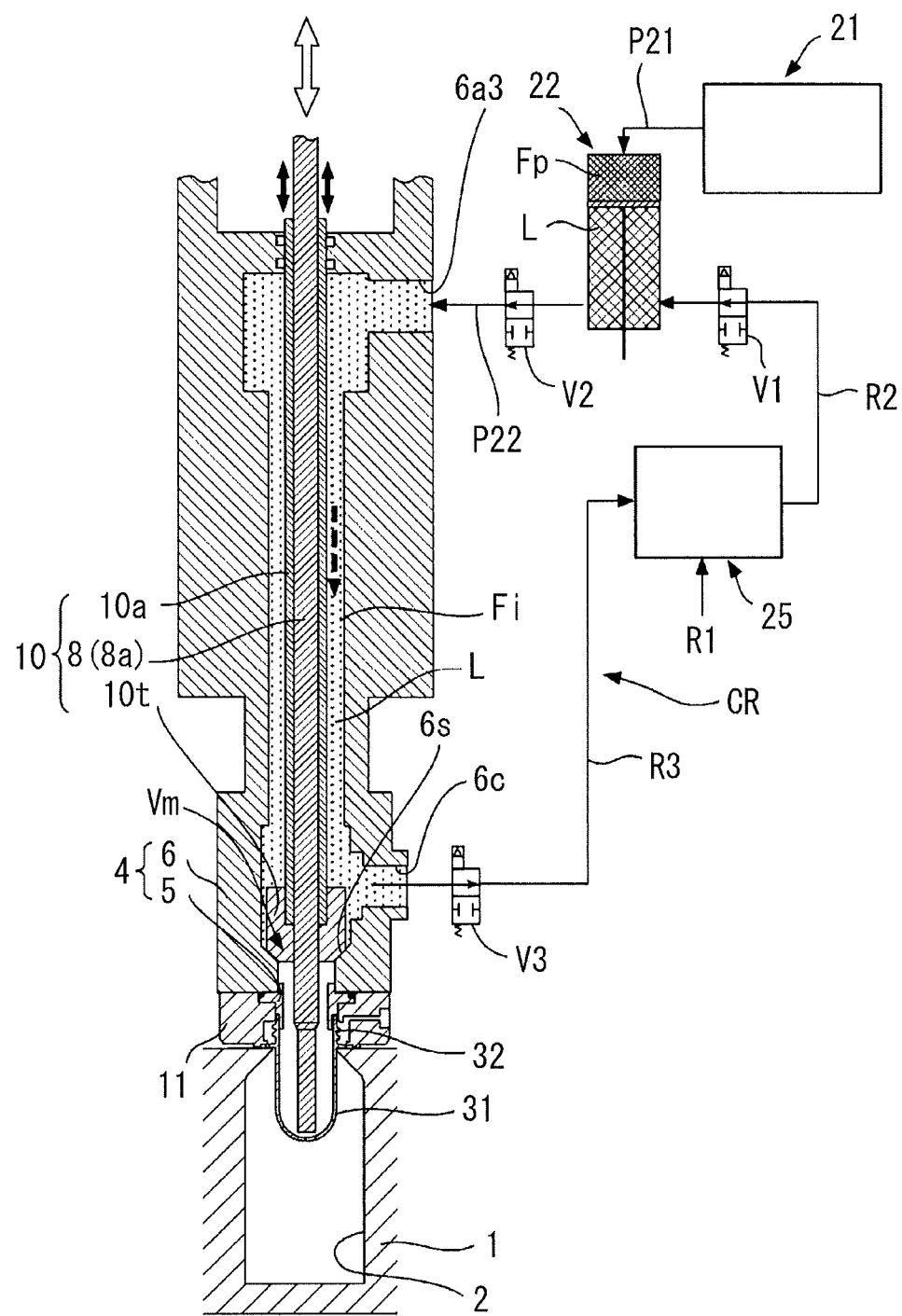
FIG. 18 is a schematic view illustrating one example of an overall structure of a blow molding device according to the present invention (a third embodiment)
Figure 19:
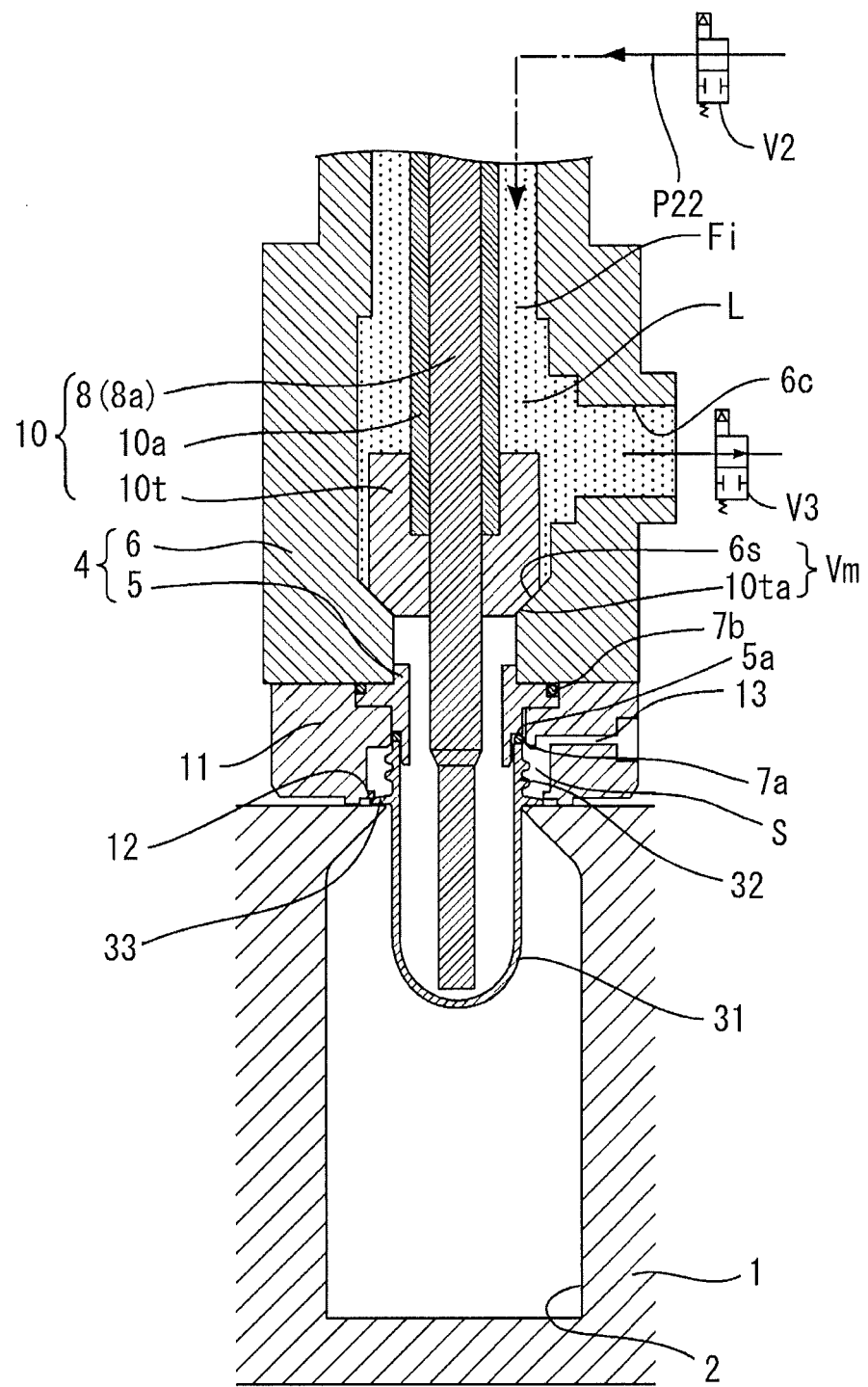
FIG. 19 is an enlarged sectional view of a lower part of the device illustrated in FIG. 18.

Firstly, with reference to FIGS. 18 and 19, the overall structure of the device is described. FIG. 18 illustrates one example of the overall structure of the blow molding device according to the present invention. FIG. 19 is an enlarged sectional view of a lower part of the device whose longitudinal sectional view is illustrated in FIG. 18. As for detailed structural elements of the part, FIG. 19 is to be referred to.

A part of the device includes the metal mold 1, the partition wall member 11, and the blow nozzle 4 and also includes, as auxiliary equipment, the pressurizing device 21, the pressurized liquid supply unit 22, and a liquid circulation unit 25.

As illustrated in FIG. 19, the partition wall member 11 is provided above the metal mold 1 such that the partition wall member 11 surrounds the outer circumferential surface of the mouth tubular portion 32 of the preform 31 projected upward of the metal mold 1 via the space S.

The partition wall member 11 is also provided with a vent hole 13 for supplying pressurized air to the space S as needed.

The entire blow nozzle body has a tubular shape. The blow nozzle 4 includes the engaging tubular piece 5 and the guiding tubular portion 6 which are tightly coupled by means of the seal member 7b.

The entire introduction tubular portion body 6 is constituted by a member including a cylindrical hollow portion inside thereof. As illustrated in FIG. 18, the introduction tubular portion 6 is provided, at an upper end portion thereof, with a supply path 6a3 for the liquid L such that the supply path 6a3 extends through the circumferential wall. The introduction tubular portion 6 is also provided, near a lower end portion thereof, with a discharge path 6c for the liquid L such that the discharge path 6c similarly extends through the circumferential wall.

On an inner circumferential surface of the lower end portion of the introduction tubular portion 6 further below the discharge path 6c, an inclined seal stepped portion 6s whose diameter is decreased downward is circumferentially provided.

In the blow nozzle 4 including the engaging tubular piece 5 and the introduction tubular portion 6, a seal pin 10 in the form of a slim rod that is long in an axis direction (in an upward-downward direction in FIGS. 18 and 19) is inserted and disposed.

In the example herein, the seal pin 10 includes a shaft body 10a that is in the form of a narrow and long cylindrical rod and the elongate cylindrical stretching rod 8a that is inserted through the shaft body 10a such that the stretching rod 8a is slidable in a liquid-tight manner. The shaft body 10a has a tip portion to which a seal tubular piece 10t having a short cylindrical shape is coaxially engaged and assembled. In a lower end surface of the seal tubular piece 10t, an outer circumferential edge portion is removed to form a tapered edge portion 10ta.

By means of the blow nozzle 4 and the seal pin 10, the cylindrical introduction path Fi is formed in the blow nozzle 4 along the axial direction of the blow nozzle 4. The introduction path Fi communicates with the inside of the preform 31.

Figure 21:
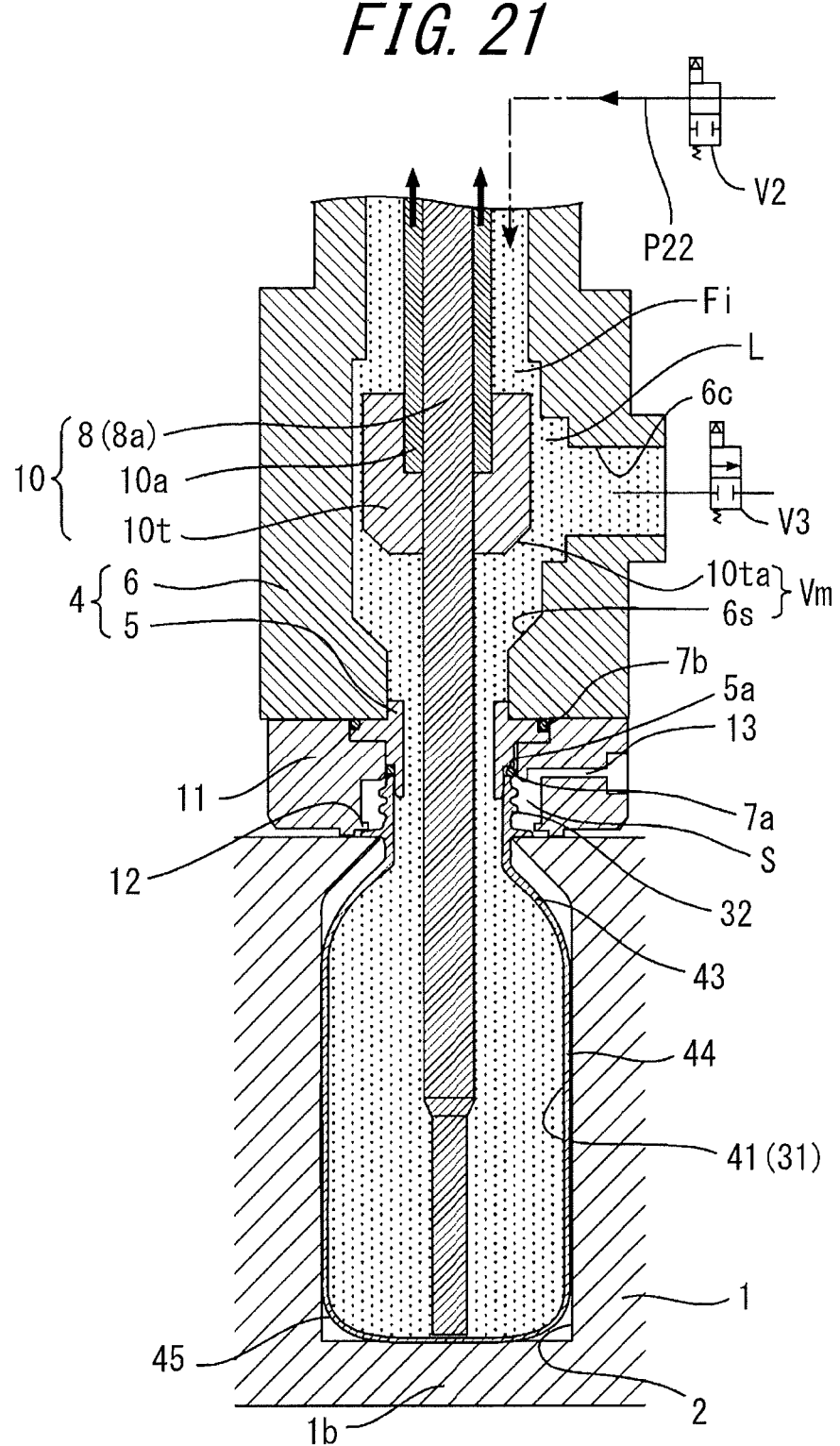
FIG. 21 is a sectional view illustrating a state right before shaping of a container is completed in a step of expandingly stretching the preform by means of a pressurized liquid from the state illustrated in FIG. 20 in the molding process by means of the device illustrated in FIG. 18.

By displacing the seal pin 10 downward, as illustrated in FIGS. 18 and 19, the tapered edge portion 10ta formed in the seal tubular piece 10t comes into abutment with the seal stepped portion 6s circumferentially provided around the inner circumferential surface of the lower end portion of the introduction tubular portion 6, thereby placing the communication of the introduction path Fi to the inside of the preform into a closed state. By displacing the seal pin 10 upward as illustrated in FIG. 21, the communication is placed into an open state. Thus, the valve mechanism Vm is configured by bringing and releasing the tapered edge portion 10ta into and from the abutment against the seal stepped portion 6s.

In the example herein, the aforementioned supply path 6a3 is located in an end portion on an upstream side of the introduction path Fi, and the discharge path 6c is located in an end portion on a downstream side of the introduction path Fi that is immediately near the upstream side of the seal stepped portion 6s.

The stretching rod 8a provides the function of vertically stretching the preform 31 as described below. The stretching rod 8a also provides a part of the function of regulating the head space in a container that is filled with the liquid L, which is used as the pressurizing medium for blow molding, as a product at the time of shaping to be a predetermined volume.

Next, the auxiliary equipment is described. The pressurized liquid Fp supplied from the pressurizing device 21 through the pipe P21 serves as a power source for driving the pressurized liquid supply unit 22 in the form of a plunger pump configured to supply the pressurized liquid L.

For driving the pressurized liquid supply unit 22, a servo motor may also be used.

In the device according to the present embodiment, the liquid circulation unit 25 is provided to provide a function of regulating the temperature of the liquid L to be a predetermined temperature while additionally supplementing the liquid L from the pipe R1 and supplying the liquid L to the pressurized liquid supply unit 22 and also to provide a function of circulating the liquid L between the pressurized liquid supply unit 22 and the introduction path Fi provided in the blow nozzle 4 while regulating the liquid L to be the predetermined temperature.

That is to say, the device is configured to be capable of circulating the liquid L in a circulation route CR constituted by, for example, the introduction path Fi→the discharge path 6c→the pipe R3→the liquid circulation unit 25→the pipe R2→the pressurized liquid supply unit 22→the pipe P22→the supply path 6a3→the introduction path Fi, as needed, when the valve mechanism Vm is in the closed state as illustrated in FIG. 18.

By providing the circulation function, the temperature of the liquid L supplied into the preform is regulated at high precision, and a quality of a container that is molded is stabilized, and productivity is improved.

The circulation route CR is provided with a plurality of valves configured to open and close the flow path as needed in accordance with a blow molding process. In FIG. 18, three valves V1, V2, and V3 are illustrated.

Secondly, with reference to FIGS. 18-23, a description is given of one example of a manufacturing method of a synthetic resin container with use of the blow molding device described above, namely, a blow molding method using the liquid as the pressurizing medium according to the present invention. (FIGS. 19, 20, and 21, among FIGS. 18-23, each are an enlarged sectional view of a lower part of the device.)

In blow molding, the steps described in (1)-(7) below are performed in sequence.

(1) To start with, the preform 31 which, except for the mouth tubular portion 32, is heated to a temperature suitable for blow molding is fitted to the metal mold 1 used for blow molding, with the mouth tubular portion 32 being projected upward, and mold closing is performed.

(2) Subsequently, the partition wall member 11 and the blow nozzle 4, which are assembled and fixed, are displaced downward from above the mouth tubular portion 32, and the tip portion of the engaging tubular piece 5 is engaged into the mouth tubular portion 32. Then, the state illustrated in FIGS. 18 and 19 is achieved.

At this time, the tapered edge portion 10ta of the seal tubular piece 10t that constitutes the tip portion of the seal pin 10 is abutted against the seal stepped portion 6s provided in the introduction tubular portion 6 so that the valve mechanism Vm is in the closed state, and the stretching rod 8a is inserted in the preform 31.

The valves V1, V2, and V3 are all in the open state, and the liquid L is circulated in the aforementioned circulation route CR while being regulated in temperature by the liquid circulation unit 25.

(3) Subsequently, as illustrated in the states from FIG. 19 to FIG. 20, the preform 31 is vertically stretched by means of the stretching rod 8a, and a middle portion of a bottom wall 35 of the preform 31 is sandwiched between the tip portion of the stretching rod 8a and a bottom wall 1b of the metal mold 1.

In this regard, although in the present embodiment the preform 31 is vertically stretched by means of the stretching rod 8a until the bottom wall 35 of the preform 31 comes into abutment against the bottom wall 1b of the metal mold, the preform 31 may also be vertically stretched halfway in consideration of productivity of blow molding, thickness distribution of a container to be molded, or the like.

(4) Subsequently, as illustrated in the states from FIG. 20 to FIG. 21, the seal tubular piece 10t is displaced upward in conjunction with the shaft body 10a constituting the seal pin 10 so that the valve mechanism Vm is switched to the open state, and the valve V3 is switched to the closed state, and the valve V1 is switched to the closed state. By doing so, the pressurized liquid L is supplied from the pressurized liquid supply unit 22 into the preform 31 through the introduction path Fi provided in the blow nozzle 4 and through the mouth tubular portion 32, so as to expandingly stretch the container 41 in accordance with the shape of the cavity 2 for shaping.

In FIG. 21, as can be seen from a gap with a surface of the cavity 2 near a shoulder portion 43 and a bottom portion 45, the container 41 is in a state immediately before the shaping is completed and in a state where a circumferential wall of a trunk portion 44 is in loose contact with the surface of the cavity 2.

The shaping by means of the pressurized liquid may also be performed simultaneously with the vertical stretching by means of the stretching rod 8a in the step (3).

Figure 22:
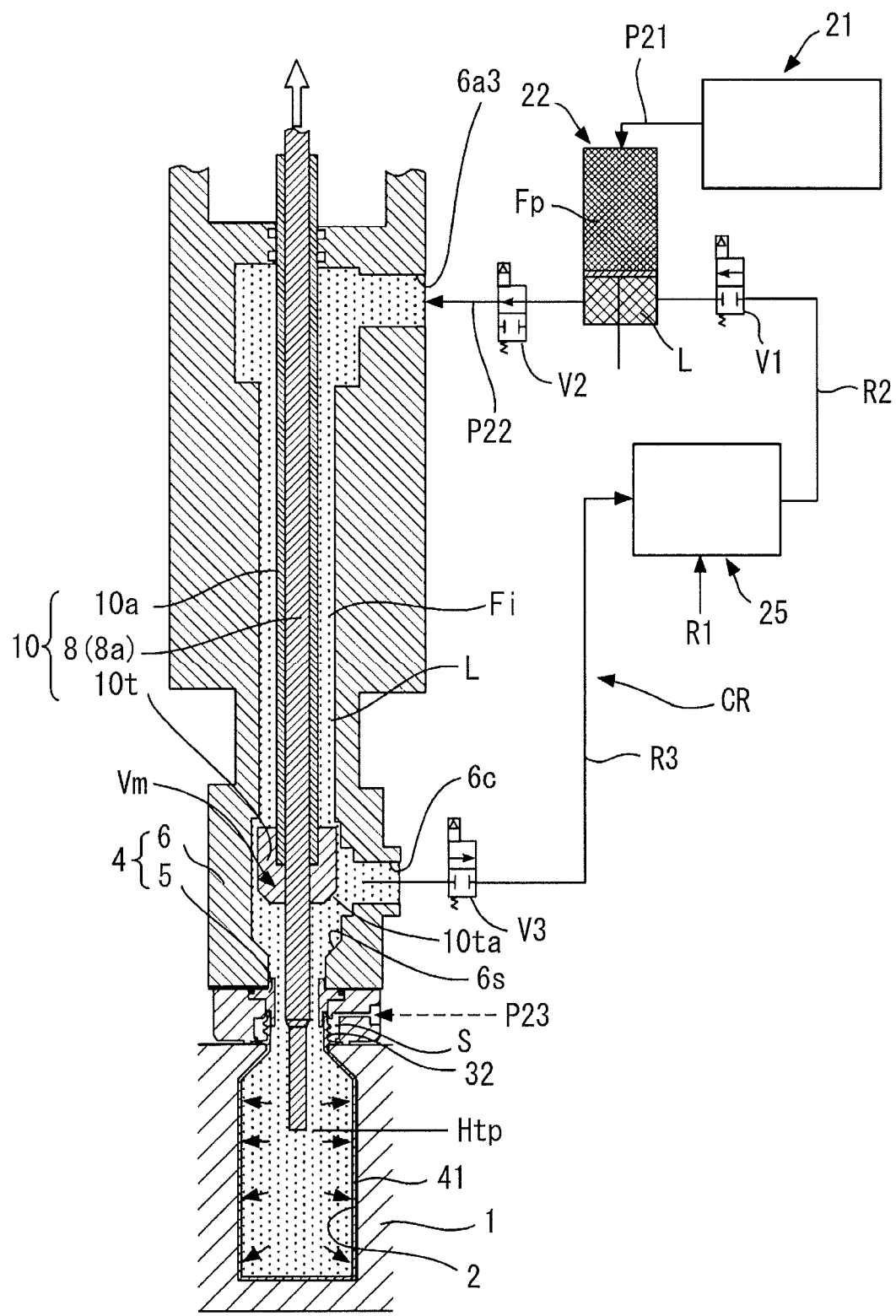
FIG. 22 is a sectional view illustrating a state where a stretching rod is pulled up to a predetermined height position and where the shaping of the container is completed from the state illustrated in FIG. 21 in the molding process by means of the device illustrated in FIG. 18.

(5) Subsequently, at predetermined timing (the state illustrated in FIG. 21) before the container 41 is pressurized and filled with the liquid L and before the shaping of the container 41 is completed, as illustrated in FIG. 22, the stretching rod 8a is pulled up until the tip portion of the stretching rod 8a reaches a predetermined height position Htp inside the container 41.

At this time, in conjunction with the pulling-up operation of the stretching rod 8a, the pressurized liquid L is filled to the inside of the container 41 by an amount corresponding to the degree to which the stretching rod 8a is displaced upward. Accordingly, while volume reduction and deformation of the container 41 as a result of the pulling-up of the stretching rod 8a is prevented, the shaping of the container 41 in accordance with the cavity 2 of the metal mold 1 is completed as illustrated in FIG. 22. Furthermore, dwelling and cooling are performed by the pressurized liquid L pressing a circumferential wall of the container 41 against the surface of the cavity 2.

In a case where the mouth tubular portion 32 undergoes diameter increase and deformation due to pressure of the supplied pressurized liquid L in the state illustrated in FIG. 22, it is possible to effectively prevent such diameter increase and deformation by introducing pressurized air into the partition wall member 11 via the vent hole 13 provided in the partition wall member 11 via a pipe P23 and by pressurizing the space S surrounding the outer circumferential surface of the mouth tubular portion 32.

Figure 23:
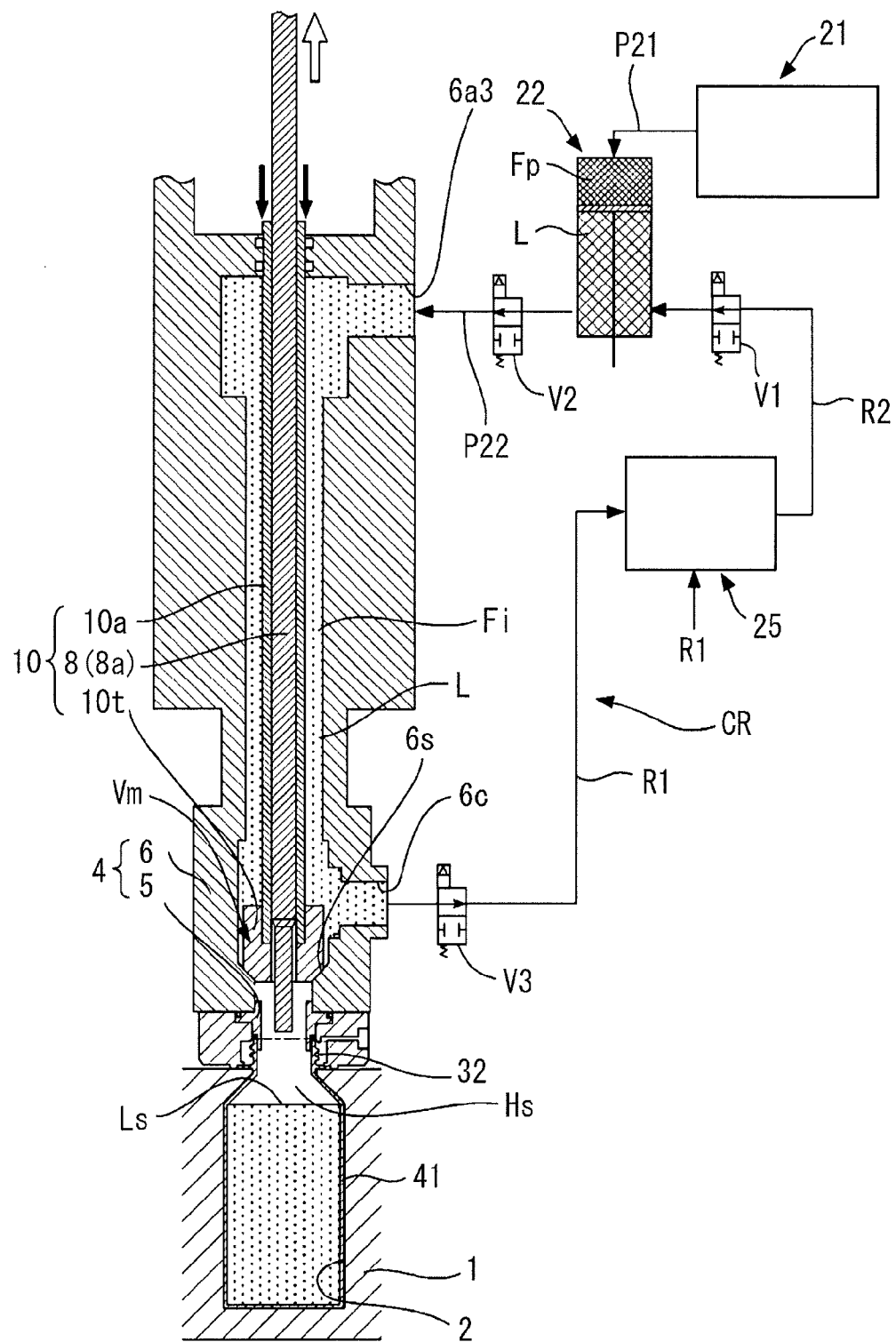
FIG. 23 is a sectional view illustrating a state where the stretching rod is disinserted from the container from the state illustrated in FIG. 22 in the molding process by means of the device illustrated in FIG. 18.

(6) Subsequently, at predetermined timing after the pulling-up of the stretching rod 8a, as illustrated in the states from FIG. 22 to FIG. 23, the shaft body 10a is displaced downward, so that the introduction path Fi is in the closed state by means of the valve mechanism Vm. Then, the stretching rod 8a is disinserted from the container 41.

At this time, the valve V3 is switched to the open state, and the liquid L is circulated along the circulation route CR again.

In the above circumstance, in conjunction with the disinsertion of the stretching rod 8a, all the liquid L remaining in a portion of the introduction path Fi below the valve mechanism Vm is flowed into the container 41, and the liquid surface Ls is lowered in the container 41. As a result, the head space is regulated to be the predetermined head space Hs set in advance as illustrated in FIG. 23.

(7) Although not illustrated, the blow nozzle 4 is disengaged from the mouth tubular portion 32 of the container 41, and the metal mold 1 is opened so as to extract the container 41. Then, the mouth tubular portion 32 is sealed with a cap to obtain a product.

Although in the device according to the above embodiment, the liquid L is circulated by means of the circulation route CR, the circulation route may be omitted in the device.

Furthermore, although in the above embodiment the liquid L is supplied from the pressurized liquid supply unit 22 to the introduction path Fi via the supply path 6a3, how to supply the liquid L may be appropriately selected from a variety of ways.

Moreover, as for opening and closing of the introduction path Fi, although a description has been given of the example in which the valve mechanism Vm is configured by bringing and releasing the tapered edge portion 10ta into and from abutment against the seal stepped portion 6s, a variety of opening/closing mechanisms may be adopted.

Moreover, in the above embodiment, the tip portion of the stretching rod is pulled up from the position after the vertical stretching of the tip portion until the tip portion reaches the predetermined height position inside the container at the timing immediately before the shaping of the container 41 is completed as illustrated in FIG. 21. However, the above timing may be during the shaping of the container by expansion and stretching by means of the pressurized liquid, at the same time as the shaping is completed, after a predetermined time period after the shaping is completed, or the like, and is not particularly limited. The timing may be appropriately determined in consideration of blow moldability including productivity, presence of volume reduction and deformation, presence of residual strain in the molded container, uniformity of the circumferential wall, or the like.

Figure 20:
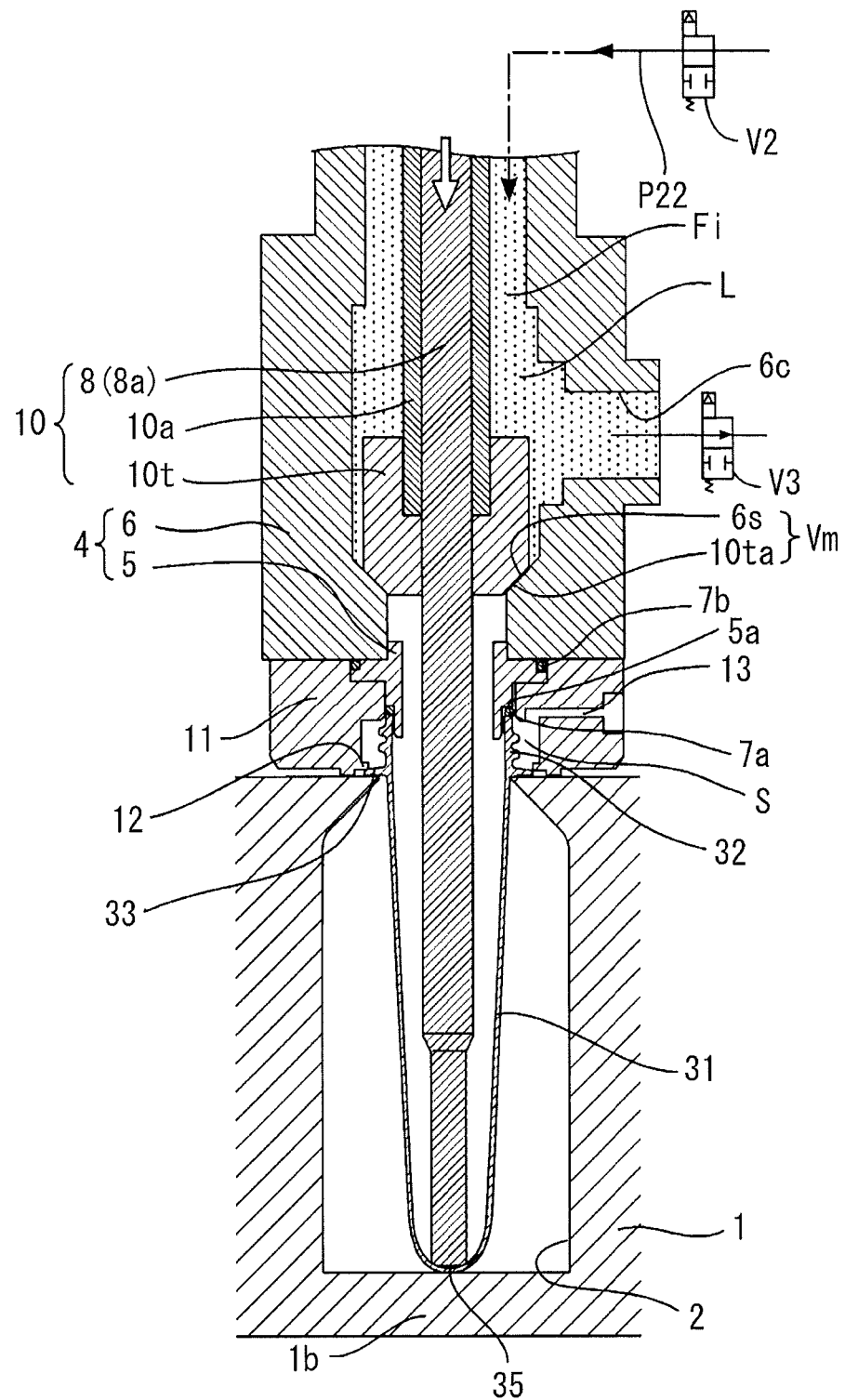
FIG. 20 is a sectional view illustrating a state where the preform is vertically stretched by means of a stretching rod from the state illustrated in FIG. 19 in the molding process by means of the device illustrated in FIG. 18.
Figure 24:
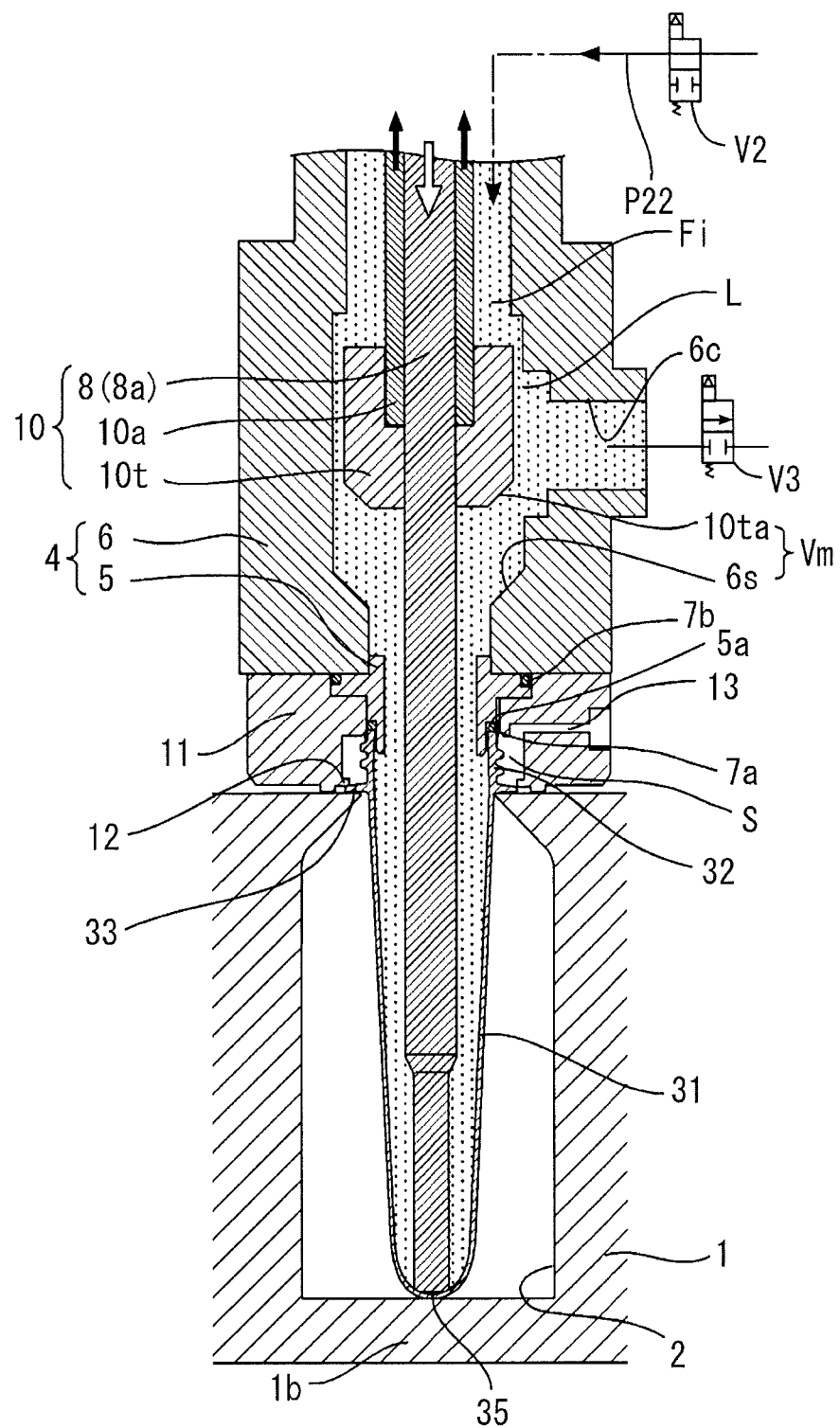
FIG. 24 is a sectional view illustrating another example of the molding process.

For example, FIG. 24 is a sectional view illustrating one example of a variation of the steps illustrated from FIG. 20 to FIG. 21 in the above embodiment. In the figure, the pressurized liquid L is supplied into the preform 31 simultaneously with the vertical stretching by means of the stretching rod 8a.

In more detail, FIG. 24 illustrates a state where the vertical stretching is completed, by vertically stretching the preform 31 by means of the stretching rod 8a from the state illustrated in FIG. 19, and by supplying the pressurized liquid L into the preform 31 while the valve V3 and the valve V1 are in the closed state, and the shaft body 10a is displaced upward so that the valve mechanism Vm is in the open state.

As another process, it is also possible to pull up the stretching rod 8a until the tip portion of the stretching rod 8a reaches the predetermined height position Htp within the container 41 as illustrated in FIG. 22 immediately after the vertical stretching by means of the stretching rod 8a is completed, and to complete the shaping of the container 41 while the supply of the pressurized liquid L is continued to maintain the expansion and shaping.

Figure 25:
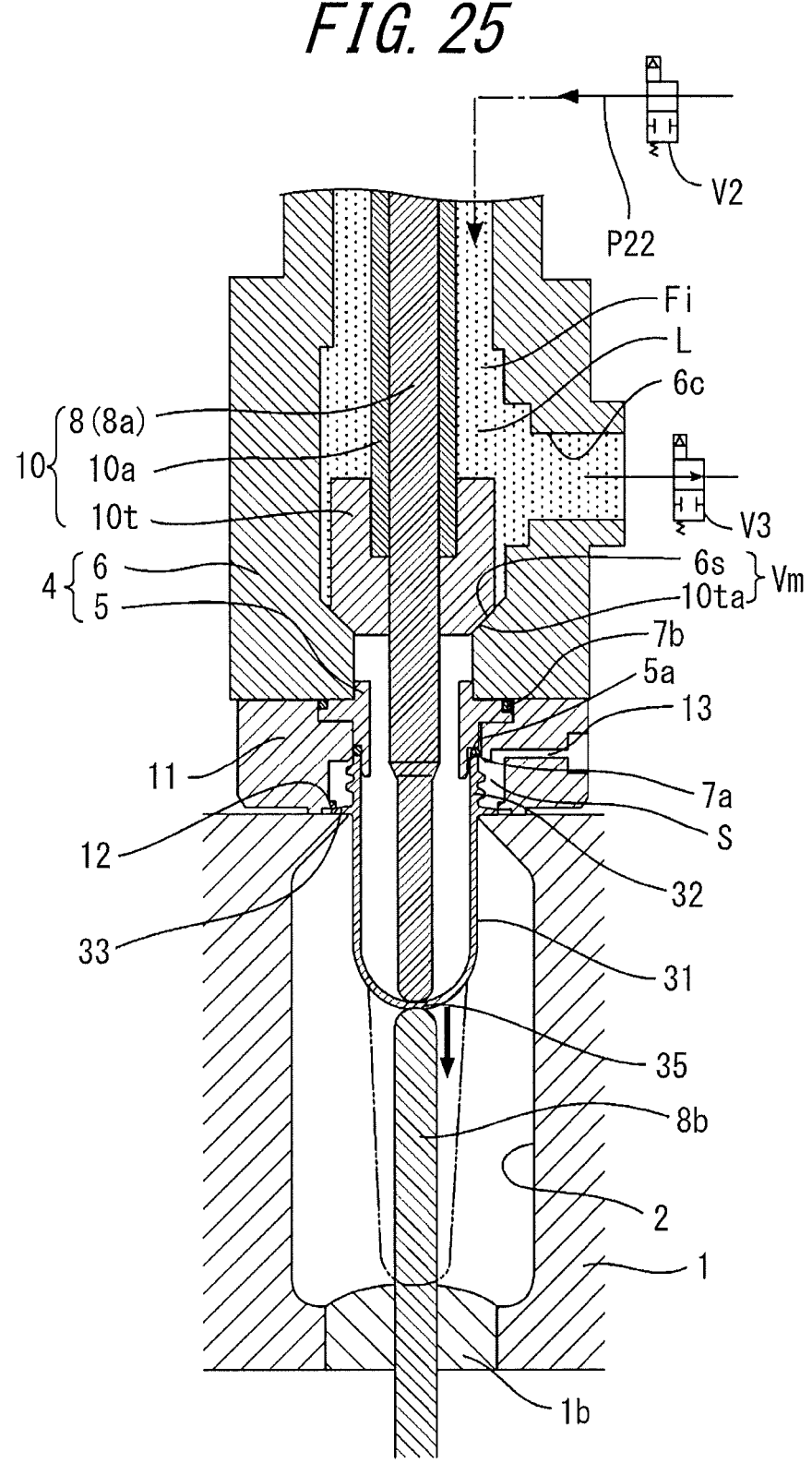
FIG. 25 illustrates another embodiment of vertical stretching by means of a stretching rod.
Figure 26:
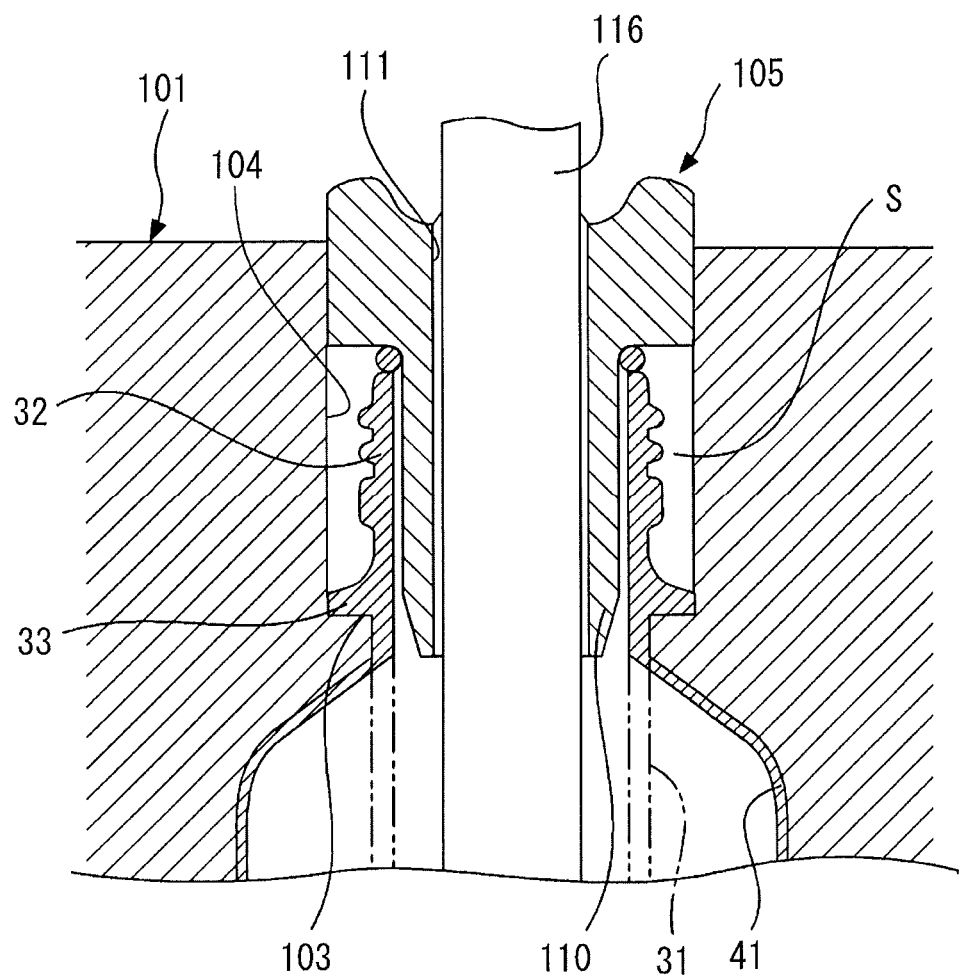
FIG. 26 is a sectional view illustrating a part of a conventional blow molding device.

Moreover, in the above embodiment, the preform 31 is vertically stretched by means of the stretching rod 8a as illustrated in FIG. 20. However, in order to further prevent core misalignment during molding, as illustrated in FIG. 25, a rod-shaped holding pin 8b may be inserted and disposed in a middle portion of the bottom wall 1b of the metal mold 1. In this case, the vertical stretching may be performed in a state where the bottom wall 35 of the preform 31 is sandwiched between the tip portion of the stretching rod 8a and a tip portion of the holding pin 8b.

Although the blow molding device and the manufacturing method of a container with use of the device according to the embodiments of the present invention have been described, needless to say, the present invention is not limited to the above embodiments.

INDUSTRIAL APPLICABILITY

As described above, a blow molding device according to the present invention that uses a pressurized liquid is capable of regulating head space of the liquid, such as a beverage, a cosmetic product, a pharmaceutical product, or the like, that is filled in a final product at the time of shaping of a container, to be a predetermined volume, easily, reproducibly, and reliably. Accordingly, the blow molding device according to the present invention is expected to be used and developed in a wide variety of blow molding fields.

REFERENCE SIGNS 1 metal mold
1b; bottom wall
2; cavity
4; blow nozzle
5; engaging tubular piece
5a; circumferential stepped portion
6; introduction tubular portion
6a; through path
6a1, 6a2; through hole
6a3; supply path
6b; vent hole
6c; discharge path
6s; seal stepped portion
7a, 7b; seal member
8; rod
8a; stretching rod
8b; holding pin
9; tubular portion 9a; horizontal hole
10; seal pin
10a; shaft body
10t; seal tubular piece
10ta; tapered edge portion
9; tubular portion
9a; horizontal hole
11; partition wall member
12; support flange piece
21; pressurizing device
22; pressurized liquid supply unit
23; pressurized air supply unit
24; second pressurized air supply unit
25; liquid circulation unit
A; pressurized air
A2; second pressurized air
Fi; introduction path
Fs1, Fs2; supply path
Fd; discharge path
Hs; head space
Htp; height position
L; liquid
Ls; Liquid surface
P1-P4; pipe
P11-P17; pipe
P21-P23; pipe
R1-R3; pipe
V1, V2, V3; valve
Vm; valve mechanism
S; space
31; preform
32; mouth tubular portion
33; neck ring
41; container
43; shoulder portion
44; trunk portion
45; bottom portion
101; metal mold
103; neck support flange portion
104; assembly recess
105; blow nozzle
110; guide tubular portion
111; insertion hole
116; rod

The invention claimed is:

1. A blow molding device for blow molding a bottomed tubular preform including a mouth tubular portion projecting at an upper end of the preform, the blow molding device comprising:
   a metal mold used for blow molding, the metal mold having a cavity defining a container shape; and
   a blow nozzle, the blow nozzle configured to tightly communicate with the mouth tubular portion with the preform is fitted to the metal mold, the blow nozzle including a circumferential wall having a vent hole defined there through, a valve coupled to the vent hole and configured to communicate an outside of the blow nozzle with an inside of the blow nozzle,
   a rod disposed in the blow nozzle the rod including a tip portion configured to be inserted into the preform, a tubular introduction path formed between the blow nozzle and the rod, whereby a pressurized liquid is supplied into the preform via the tubular introduction path thereby expandingly shaping a container in accordance with the cavity of the metal mold, and
   when the container is shaped with the supply of the pressurized liquid is stopped, the rod is disinserted from the container, and according to a shape and an insert position of the tip portion of the rod, head space of the shaped container that is filled with the liquid is regulated to be a predetermined volume.

2. The blow molding device of claim 1, wherein
   the rod comprises a stretching rod for vertically stretching the preform.

3. A manufacturing method of a synthetic resin container with use of the blow molding device of claim 1, the manufacturing method comprising steps of:
   fitting the bottomed tubular preform to the metal mold used for the blow molding with the mouth tubular portion of the preform being projected to outside;
   inserting the tip portion of the rod into the preform;
   supplying a pressurized liquid from the mouth tubular portion into the preform via the introduction path, and expandingly shaping the container by means of the pressurized liquid in accordance with a shape of the cavity of the metal mold; and
   after the container is shaped, stopping the supply of the pressurized liquid, disinserting the tip portion of the rod from the container, and regulating head space of the shaped container that is filled with the liquid to be the predetermined volume.

4. The manufacturing method for a synthetic resin container of claim 3, wherein
   the rod comprises a stretching rod used for vertical stretching, and
   the preform is vertically stretched by the stretching rod, and the pressurized liquid is supplied from the mouth tubular portion into the preform via the introduction path, and by means of the pressurized liquid, the container is expandingly shaped in accordance with the shape of the cavity of the metal mold.

5. The manufacturing method of a synthetic resin container of claim 3, wherein
   when the rod is disinserted from the container after the container is shaped and the supply of the pressurized liquid is stopped, a vent hole is switched to an open state for bringing an outside of the blow nozzle into communication with an inside of the blow nozzle.

6. The blow molding device of claim 1, wherein
   the rod comprises a stretching rod for vertically stretching the preform, the stretching rod including a tubular portion in a region extending from an upper end portion to a predetermined height position of the stretching rod, the tubular portion being provided, inside thereof, with a discharge path extending vertically, and the stretching rod also including a horizontal hole provided below the tubular portion to extend through a tubular wall and communicate with the discharge path,
   the pressurized liquid is supplied into the preform via the tubular introduction path formed by means of the blow nozzle and the stretching rod, thereby shaping the container in accordance with the cavity of the metal mold, and
   after the container is shaped and the supply of the pressurized liquid is stopped, pressurized air is supplied to the introduction path, thereby pressurizing the liquid remaining in a portion extending from the inside of the container to the introduction path, and thereby discharging a part of the remaining liquid via the horizontal hole of the stretching rod and the discharge path, and according to a height position at which the horizontal hole is located, the head space of the shaped container that is filled with the liquid is regulated to be the predetermined volume.

7. The blow molding device of claim 6, wherein the discharged liquid is returned to the pressurized liquid supply unit configured to supply the pressurized liquid.

8. The blow molding device of claim 6, wherein
the blow nozzle at a tip thereof an engaging tubular piece configured to be engaged into the mouth tubular portion of the preform,
the engaging tubular piece provided on an outer circumferential wall of the blow nozzle and including a circumferential stepped portion whose diameter is decreased toward and end thereof, and
the blow nozzle is brought into the tight communication with the mouth tubular portion as a result of abutment between the circumferential stepped portion and an upper end surface of the mouth tubular portion via a seal member.

9. The blow molding device of claim 1, wherein
the rod comprises a stretching rod for vertically stretching the preform, and the container is shaped in accordance with the cavity of the metal mold by the vertical stretching by way of the stretching rod and by expansion and stretching by way of the pressurized liquid,
an actuator coupled to the stretching rod and configured to pull up the tip portion of the stretching rod until the tip portion reaches a predetermined height position inside the container at predetermined timing after the vertical stretching by way of the stretching rod in a state where the supply of the pressurized liquid for the expansion and stretching is continued,
the actuator further configured to disinsert the stretching rod from the container in a state where the supply of the pressurized liquid is stopped, at predetermined timing after the stretching rod is pulled up, and
according to a shape of the stretching rod and the height position to which the tip portion of the stretching rod is pulled up, the head space of the shaped container that is filled with the liquid is regulated to be the predetermined volume.

10. The blow molding device of claim 9, wherein
the blow nozzle having at a tip thereof an engaging tubular piece configured to be engaged into the mouth tubular portion of the preform,
the engaging tubular piece including on an outer circumferential wall thereof a circumferential stepped portion whose diameter is decreased toward and end thereof, and
the blow nozzle is brought into the tight communication with the mouth tubular portion as a result of abutment between the circumferential stepped portion and an upper end surface of the mouth tubular portion via a seal member.

11. The blow molding device of claim 9, wherein
a valve mechanism is provided in an end portion on a downstream side of the introduction path formed in the blow nozzle for allowing the introduction path to be opened and closed.

12. A manufacturing method of a synthetic resin container with use for the blow molding device of claim 9, the manufacturing method comprising the following steps 1 to 3, so as to regulate the head space in the shaped container that is filled with liquid to be the predetermined volume:
the step 1 of supplying the pressurized liquid from the mouth tubular portion into the preform via the introduction path formed in the blow nozzle while the preform is vertically stretched by means of the stretching rod or after the vertical stretching is completed, thereby expandingly shaping the container in accordance with a shape of the cavity of the metal mold:
the step 2 of pulling up the tip portion of the stretching rod until the tip portion reaches from the position of the tip portion after the vertical stretching to the predetermined height position inside the container at the predetermined timing after the vertical stretching by means of the stretching rod in the state where the supply of pressurized liquid for the expansion and stretching is continued; and
the step 3 of stopping the supply of the pressurized liquid and disinserting the stretching rod from the container at the predetermined timing after the tip portion of the stretching rod reaches the predetermined height position and after the shaping of the container is completed.

13. The manufacturing means of a synthetic resin container of claim 12, wherein
after the vertical stretching by means of the stretching rod, a middle portion of a bottom wall of the vertically stretched preform is sandwiched between the tip portion of the stretching rod and a bottom wall of the metal mold.

14. The manufacturing method of a synthetic resin container of claim 12, wherein
the valve mechanism is provided in the end portion on the downstream side of the introduction path formed in the blow nozzle for allowing the introduction path to be opened and closed, the valve mechanism being configured to control the pressurized liquid to be supplied into the preform or into the container or to be stopped.

15. A blow molding device for blow molding a bottomed tubular preform including a mouth tubular portion projecting at an upper end of the preform, the blow molding device comprising:
a metal mold used for blow molding, the metal mold having a cavity defining a container shape;
a blow nozzle, the blow nozzle configured to tightly communicate with the mouth tubular portion with the preform is fitted to the metal mold;
the blow nozzle having at a tip thereof an engaging tubular piece configured to be engaged into the mouth tubular portion of the preform,
the engaging tubular piece being provided on an outer circumferential wall of the blow nozzle and including a circumferential stepped portion whose diameter is decreased toward an end thereof, and
the blow nozzle is brought into the tight communication with the mouth tubular portion as a result of abutment between the circumferential stepped portion and an upper end surface of the mouth tubular portion via a seal member;
a rod disposed in the blow nozzle, the rod including a tip portion configured to be inserted into the preform;
a tubular introduction path formed between the blow nozzle and the rod, whereby a pressurized liquid is supplied into the preform via the tubular introduction path thereby expandingly shaping a container in accordance with the cavity of the metal mold;
when the container is shaped with the supply of the pressurized liquid is stopped, the rod is disinserted from the container, and according to a shape and an insert position of the tip portion of the rod, head space of the shaped container that is filled with the liquid is regulated to be a predetermined volume.

16. A blow molding device for blow molding a bottomed tubular preform including a mouth tubular portion projecting at an upper end of the preform, the blow molding device comprising:
a metal mold used for blow molding; and
a blow nozzle configured to tightly communicate with the mouth tubular portion with the preform is fitted to the metal mold, wherein
in a state where a rod is disposed to be inserted into the blow nozzle and where a tip portion of the rod is inserted into the preform, a pressurized liquid is supplied into the preform via a tubular introduction path formed by means of the blow nozzle and the rod, thereby expandingly shaping a container in accordance with a cavity of the metal mold,
when the container is shaped with the supply of the pressurized liquid is stopped, the rod is disinserted from the container, and according to a shape and an insert position of the tip portion of the rod, head space of the shaped container that is filled with the liquid is regulated to be a predetermined volume
the rod comprises a stretching rod for vertically stretching the preform, the stretching rod including a tubular portion in a region extending from an upper end portion to a predetermined height position of the stretching rod, the tubular portion being provided, inside thereof, with a discharge path extending vertically, and the stretching rod also including a horizontal hole provided below the tubular portion to extend through a tubular wall and communicate with the discharge path,
the pressurized liquid is supplied into the preform via the tubular introduction path formed by the blow nozzle and the stretching rod, thereby shaping the container in accordance with the cavity of the metal mold,
a pressurized liquid supply unit configured to supply the pressurized liquid; and
a pressurized air supply unit configured to supply pressurized air, wherein
the pressurized liquid supply unit and the pressurized air supply unit are driven by a common pressurizing device
after the container is shaped and the supply of the pressurized liquid is stopped, pressurized air is supplied to the introduction path, thereby pressurizing the liquid remaining in a portion extending from the inside of the container to the introduction path, and thereby discharging a part of the remaining liquid via the horizontal hole of the stretching rod and the discharge path, and according to a height position at which the horizontal hole is located, the head space of the shaped container that is filled with the liquid is regulated to be the predetermined volume.

17. A manufacturing method of a synthetic resin container with use of the blow molding device of claim 6, the manufacturing method comprising the steps of:
fitting the bottomed tubular preform to the metal mold used for the blow molding with the mouth tubular portion being projected to outside in a state where a predetermined portion of the preform excluding the mouth tubular portion is heated to a temperature at which a stretching effect is achieved;
vertically stretching the preform by means of the stretching rod and supplying the pressurized liquid from the mouth tubular portion into the preform via the introduction path so as to expandingly stretch the preform, thereby shaping the container in accordance with a shape of the cavity of the metal mold;
after the container is shaped, stopping the supply of the pressurized liquid;
supplying the pressurized air to the introduction path; and
pressurizing the liquid remaining in the portion extending from the inside of the container to the introduction path by means of the pressurized air, thereby discharging the remaining liquid to outside via the horizontal hole of the stretching rod and the discharge path until a liquid surface of the liquid reaches the height position of the horizontal hold of the stretching rod.

18. A blow molding device for blow molding a bottomed tubular preform including a mouth tubular portion projecting at an upper end of the preform, the blow molding device comprising:
a metal mold used for blow molding; and
a blow nozzle configured to tightly communicate with the mouth tubular portion with the preform is fitted to the metal mold, wherein
in a state where a rod is disposed to be inserted into the blow nozzle and where a tip portion of the rod is inserted into the preform, a pressurized liquid is supplied into the preform via a tubular introduction path formed by means of the blow nozzle and the rod, thereby expandingly shaping a container in accordance with a cavity of the metal mold, and
when the container is shaped with the supply of the pressurized liquid is stopped, the rod is disinserted from the container, and according to a shape and an insert position of the tip portion of the rod, head space of the shaped container that is filled with the liquid is regulated to be a predetermined volume,
the rod comprises a stretching rod for vertically stretching the preform, and the container is shaped in accordance with the cavity of the metal mold by the vertical stretching by way of the stretching rod and by expansion and stretching by way of the pressurized liquid,
an actuator configured to pull up the tip portion of the stretching rod until the tip portion reaches a predetermined height position inside the container at predetermined timing after the vertical stretching by way of the stretching rod in a state where the supply of the pressurized liquid for the expansion and stretching is continued,
the actuator further configured to disinsert the stretching rod from the container in a state where the supply of the pressurized liquid is stopped, at predetermined timing after the stretching rod is pulled up, and
according to a shape of the stretching rod and the height position to which the tip portion of the stretching rod is pulled up, the head space of the shaped container that is filled with the liquid is regulated to be the predetermined volume
a valve mechanism is provided in an end portion on a downstream side of the introduction path formed in the blow nozzle for allowing the introduction path to be opened and closed,
a tubular rod-shaped shaft body is displaceably inserted and disposed in the blow nozzle along an axis direction of the blow nozzle, and the stretching rod is inserted in the shaft body such that the stretching rod is slidable in a liquid tight manner, the shaft body and the stretching rod constituting a seal pin, and
the valve mechanism is configured by bringing and releasing a tip portion of the seal pin into and from the abutment against a seal stepped portion provided on an inner circumferential surface of the blow nozzle.

* * * * *